US010707929B2

(12) United States Patent
Chang et al.

(10) Patent No.: US 10,707,929 B2
(45) Date of Patent: Jul. 7, 2020

(54) METHODS OF PROCESSING SIGNALS, APPARATUS, AND BASE STATION

(71) Applicant: Apple Inc., Cupertino, CA (US)

(72) Inventors: Wenting Chang, Beijing (CN); Xu Zhang, Beijing (CN); Yujun Chen, Beijing (CN); Jiansong Tian, Beijing (CN); Guangjie Li, Beijing (CN); Ye Wu, Beijing (CN); Feng Zhou, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/756,991

(22) PCT Filed: Sep. 10, 2015

(86) PCT No.: PCT/CN2015/089343
§ 371 (c)(1),
(2) Date: Mar. 2, 2018

(87) PCT Pub. No.: WO2017/041270
PCT Pub. Date: Mar. 16, 2017

(65) Prior Publication Data
US 2018/0287673 A1    Oct. 4, 2018

(51) Int. Cl.
*H04B 7/0452* (2017.01)
*H04L 25/02* (2006.01)
(Continued)

(52) U.S. Cl.
CPC ......... *H04B 7/0452* (2013.01); *H04B 7/0413* (2013.01); *H04B 7/0842* (2013.01);
(Continued)

(58) Field of Classification Search
None
See application file for complete search history.

(56) References Cited

U.S. PATENT DOCUMENTS

2012/0062421 A1\*  3/2012  Su ................. H04B 7/0417
                                                         342/373
2012/0176966 A1    7/2012  Ling
(Continued)

FOREIGN PATENT DOCUMENTS

| CN | 104754644 A | 7/2015 |
| WO | 2011157165 A2 | 12/2011 |
| WO | 2014110730 A1 | 7/2014 |

OTHER PUBLICATIONS

International Search Report based on application No. PCT/CN2015/089343 (12 pages) dated May 30, 2016 (Reference Purpose Only).
(Continued)

*Primary Examiner* — Saba Tsegaye
(74) *Attorney, Agent, or Firm* — Kowert, Hood, Munyon, Rankin & Goetzel, P.C.

(57) ABSTRACT

A method of processing signals in a radio processing apparatus of a base station may include obtaining a plurality of aggregated data symbols, wherein each of the plurality of aggregated data symbols corresponds to a receive terminal of a plurality of receive terminals of the base station and is composed of transmitted data symbols from a plurality of transmit terminals; applying a compression filter to the plurality of aggregated data symbols to reduce the plurality of aggregated data symbols into a plurality of isolated data symbols, the compression filter being based on channel estimates between the plurality of receive terminals and the plurality of transmit terminals; and transmitting the plurality of isolated data symbols to a baseband processing apparatus of the base station.

20 Claims, 9 Drawing Sheets

(51) Int. Cl.
| | |
|---|---|
| H04W 28/06 | (2009.01) |
| H04W 8/00 | (2009.01) |
| H04B 7/08 | (2006.01) |
| H04B 7/0413 | (2017.01) |
| H04L 29/06 | (2006.01) |
| H04L 27/26 | (2006.01) |
| H04W 88/08 | (2009.01) |

(52) U.S. Cl.
CPC .......... *H04L 25/0224* (2013.01); *H04L 69/04* (2013.01); *H04W 8/00* (2013.01); *H04W 28/06* (2013.01); *H04L 27/2639* (2013.01); *H04W 88/085* (2013.01)

(56) References Cited

U.S. PATENT DOCUMENTS

2012/0207206 A1    8/2012  Samardzija et al.
2013/0083768 A1*   4/2013  Liu .................... H04L 27/2636
                                                          370/330
2013/0322336 A1   12/2013  Cheng et al.
2015/0236765 A1    8/2015  Yu et al.
2015/0365934 A1*  12/2015  Liu ....................... H04L 5/0039
                                                          370/329
2016/0308641 A1*  10/2016  Zeng .................. H04B 10/5561
2017/0373890 A1*  12/2017  Fertonani ................ H04L 25/02

OTHER PUBLICATIONS

Bin Guo et al., "CPRI compression transport for LTE and LTE-A signal in C-RAN", Communications and Neworking in China (CHINACOM), 2012 7th International ICST Coference on Communications and Networking in China (CHINACOM), IEEE, Aug. 8, 2012. pp. 843-849.

The extended European search report received for the Application No. EP15903377.8 dated Apr. 12, 2019, 8 Pages. (Reference purpose only).

* cited by examiner

METHODS OF PROCESSING SIGNALS, APPARATUS, AND BASE STATION

RELATED APPLICATIONS

The present application is a national stage entry according to 35 U.S.C. § 371 of PCT application No.: PCT/CN2015/089343 filed on Sep. 10, 2015, which is incorporated herein by reference in its entirety.

TECHNICAL FIELD

Various embodiments relate generally to methods of processing signals, apparatuses, and base stations.

BACKGROUND

Many conventional wireless communication protocols utilize Multiple Input Multiple Output (MIMO) technologies in order to increase data transmission rates and user capacity. MIMO has emerged as an important focus in Third Generation Partnership (3GPP) mobile communication standards, in particular recent 3GPP Releases for Long Term Evolution (LTE) network configurations which have provided for the use of 2, 4, or 8 antennas.

Large scale MIMO, which may involve more than 8 antennas, has similarly become a focus for next generation wireless communication protocols. Such large scale MIMO systems may deploy 32 or even 64 antennas to acquire further spatial multiplexing and beamforming gain.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
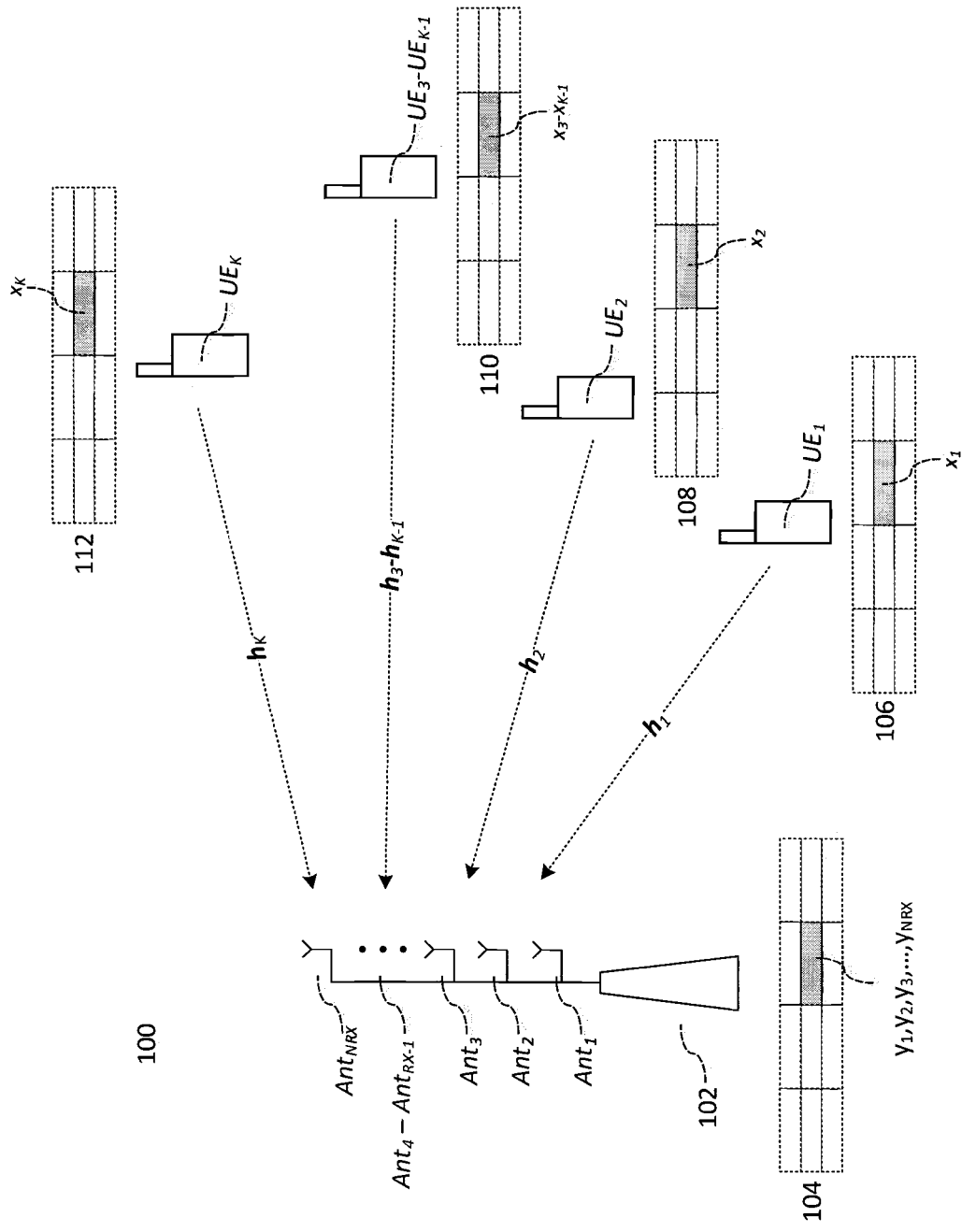
FIG. 1 shows a mobile communication network.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc.

Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a NM matrix (e.g. a row vector), and an M×1 matrix (e.g. a column vector).

As used herein, a "circuit" is understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit. In particular with respect to the use of "circuitry" in the claims included herein, the use of "circuit" (including "processing circuit") may be understood as collectively referring to two or more circuits.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

Similarly, a "processing circuit" (or equivalently "processing circuitry") is understood as referring to any circuit that performs processing, such as e.g. any circuit that performs processing on an electrical or optical signal. A processing circuit may thus refer to any analog or digital circuitry that alters a characteristic or property of an electrical or optical signal. A processing circuit may thus refer to an analog circuit, digital circuit, logic circuit, processor, microprocessor, Central Processing Unit (CPU), Graphics Processing Unit (GPU), Digital Signal Processor (DSP), Field Programmable Gate Array (FPGA), integrated circuit, or Application Specific Integrated Circuit (ASIC). Accordingly, a processing circuit may refer to a circuit that performs processing on an electrical or optical signal as hardware or as software, such as software executed on hardware. Furthermore, it is understood that a single a processing circuit may be equivalently split into two separate processing circuits, and conversely that two separate processing circuits may be combined into a single equivalent processing circuit.

The term "base station" used in reference to an access point of a mobile communication network may be understood as a macro base station, micro base station, Node B, evolved NodeBs (eNB), Home eNodeB, Remote Radio Head (RRHs), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "idle mode" used in reference to a mobile terminal refers to a radio control state in which the mobile terminal is not allocated at least one dedicated communication channel of a mobile communication network. The term "connected mode" used in reference to a mobile terminal refers to a radio control state in which the mobile terminal is allocated at least one dedicated communication channel of a mobile communication network.

Unless explicitly specified, the terms "transmit" and "send" encompass both direct and indirect transmission/sending. Similarly, the term "receive" encompasses both direct and indirect reception unless explicitly specified.

Large scale Multiple Input Multiple Output (MIMO) (or "massive" MIMO) may be implemented into mobile communication technologies in order to increase spatial multiplexing and beamforming gain. While conventional mobile communication protocols, such as Long Term Evolution (LTE) standards as specified by the Third Generation Partnership Project (3GPP), may conventionally utilize e.g. 2, 4, or 8 layer MIMO systems to support wireless communications, large scale MIMO architectures may expand to e.g. 32 or 64 layers. As spatial antenna diversity is a key component in MIMO systems, large scale MIMO architectures may involve upwards of 32 transmission and/or reception antennas.

As each antenna (or each set of combined antennas if combination of physical antennas is performed) may produce an independent data stream, massive MIMO schemes may need to support data transport of each individual data stream until symbol detection is performed to recover the original transmitted symbols. Massive MIMO schemes having 32 or more antennas may thus need to capable of supporting 32 or more individual data streams, and thus may need to support high data throughput levels.

In a mobile communication application, base stations that are part of uplink massive MIMO schemes may need to transport large quantities of data from the receive antennas to various upstream processing components until symbol detection is performed to recover the data symbols transmitted by each user terminal. Several different base station architectures may be realized in order to support massive MIMO schemes. In particular, both "thick" and "thin" base station architectures, where each architecture may offer specific advantages and disadvantages.

Base stations may conventionally be composed of a Remote Radio Unit (RRU) component and a Baseband Unit (BBU) component, where a BBU may serve multiple RRUs. BBUs may perform baseband processing of mobile communication signals, and may provide or receive digital mobile communication signals to or from one or more RRUs. RRUs may be responsible for radio frequency processing of mobile communication signals, and may include digital as well as analog circuitry in order to receive and perform initial processing on wireless radio frequency signals. A BBU may exchange digital mobile communication data with one or more RRUs over an optical fiber or similar high-speed connection, such as using a Common Public Radio Interface (CPRI) standard over an optical fiber data link.

In the aforementioned "thick" base station architecture, a BBU may be integrated into the same equipment (i.e. at the same physical location) as the RRU. As an RRU typically processes mobile communication data at a remote location (e.g. in close proximity to the base station antennas), thick base station architectures may demand similar remote placement of a BBU. However, remote placement of BBUs may inhibit many of the advantages of Coordinated Multipoint (CoMP), Inter-cell Interference Coordination (ICIC), and Carrier Aggregation (CA), which may rely on central location of multipole BBUs in centralized BBU pools in order to allow straightforward data sharing with other BBUS and/or RRUs. The lack of centralized BBU pools in "thick" architectures may generally result in reduced efficiency. Furthermore, the RRU-BBU integration employed in thick base station architectures may consume additional space and/or energy, which may in turn increase operation and maintenance costs.

Alternatively, "thin" base station architectures, which deploy only basic radio processing at remotely-located RRUs while maintaining centralized placement of BBUs, may resolve many of the aforementioned problems associated with thick base station architectures. As the RRUs only supports basic radio operations, much of the complex signal processing is tasked to centrally located BBUs, thereby allowing for relatively simple baseband information exchange and reductions in both RRU power and spatial usage. However, the interface between the RRU and BBU must be capable of handling large data streams, as data must be exchanged between the isolated locations of the RRU and BBU. As previously indicated, the data link between RRU and BBU may be required to support transmission of independent data streams each corresponding to a different receive antenna.

While the resulting data throughput levels in conventional MIMO schemes (i.e. ≤8 layers) may be relatively manageable, massive MIMO may substantially increase the link burden between the RRU and BBU. For example, a 20 MHz LTE uplink MIMO scheme with 64 antennas may require a data rate exceeding 30 GBps, which may be unreasonable for many existing base station configurations. The data link between RRU and BBU may thus present a significant barrier in realization of effective massive MIMO schemes.

Accordingly, the link burden issues of thin base station architectures in uplink MIMO paths (i.e. from RRU to BBU) may alleviated by effectively compressing data received at the RRU (e.g. from multiple user terminals) and subsequently transmitting the compressed data to the BBU over the RRU-BBU uplink interface. As opposed to transmitting independent data streams each corresponding to a respective receive antenna, the RRU may compress the data streams into essentially one per user and transmit the resulting reduced data streams to the BBU. As will be detailed herein, the RRU may utilize a channel estimation-based compression filter to efficiently compress the data before transmission to the BBU, thereby substantially reducing data throughput requirements. In certain advantageous aspects of the disclosure, the compression may be lossless and thus may not result in any performance degradation.

FIG. 1 shows mobile communication network 100. Mobile communication network 100 may include at least base station 102 and user equipment (UEs) $UE_1$-$UE_K$, where K denotes the number of UEs participating in an uplink MIMO scheme (i.e. the number of layers in the MIMO scheme). $UE_1$-$UE_K$ may each be in an active radio connection state with base station 102, and accordingly may each be allocated uplink wireless resources to transmit uplink data to base station 102.

Base station 102 may operate according to an uplink MIMO scheme. Accordingly, $UE_1$-$UE_K$ may each utilize the same time-frequency wireless uplink resource to transmit uplink data intended for base station 100. FIG. 1 shows uplink resource grids 104-112, which each illustrate uplink resources divided onto a time (horizontal axis) and frequency (vertical axis) grid.

$UE_1$-$UE_K$ may each transmit a stream of uplink data to base station 102. Each of $UE_1$-$UE_K$ may transmit the respective uplink data stream by distributing the uplink data into discrete data symbols, where each data symbol is composed of one or more logical bits representing part of the uplink data. $UE_1$-$UE_K$ may then transmit the resulting symbols using assigned time-frequency resources, such as by mapping each of the resulting symbols to a carrier frequency (corresponding to the horizontal rows of uplink resource grids (106-112) and transmitting each of the resulting symbols during a symbol period (corresponding to the vertical columns of uplink resource grids 106-112).

In accordance with an uplink MIMO scheme including $UE_1$-$UE_K$, each of $UE_1$-$UE_K$ may transmit data symbols utilizing the same time-frequency uplink resources as the other UEs, i.e. utilizing the same carrier frequency during the same symbol period. As shown in FIG. 1, $UE_1$-$UE_K$ may each transmit respective data symbols $x_1$-$x_K$ using the same carrier frequency during the same symbol period as the other UEs (symbol period and carrier frequency arbitrarily represented in FIG. 1).

Base station 102 may therefore receive a wireless signal containing data symbols $x_1$-$x_K$ at the same carrier frequency and same symbol period (relative to base station 102) as shown in uplink resource grid 104. As will be further detailed, each of data symbols $x_1$-$x_K$ received at base station 102 may be modified by the wireless channels according to channel responses $h_1$-$h_K$ between each of $UE_1$-$UE_K$ and base station 102, where each channel response $h_k$, k={1, 2, ... , K} denotes the wireless channel response between $UE_k$ and each antenna $Ant_1$-$Ant_{NRX}$ of base station 102. It is understood that for purposes of simplicity, the following description of base station 102 may refer to as $N_{RX}$ as the number of physical receive antennas at base station 102. However, as will be later described, $N_{RX}$ may alternatively refer to the number of separate data streams obtained from an antenna array having a quantity of physical antennas greater than or equal to $N_{RX}$, where one or more of the antennas in the antenna array may undergo analog combination to produce $N_{RX}$ total data streams.

As $UE_1$-$UE_K$ may each respectively transmit data symbols $x_1$-$x_K$ using the same wireless resources (i.e. same time-frequency resource), base station 104 may need to process wirelessly received signals in order to recover each of data symbols $x_1$-$x_K$. Base station 102 may rely on spatial antenna diversity and reference signals transmitted by each of $UE_1$-$UE_K$ in order to recover data symbols $x_1$-$x_K$. Despite the additional requisite processing, such an uplink MIMO scheme may conserve wireless resources as compared to single input and single output schemes, which may involve using different wireless resources for each transmitting user terminal.

Base station 102 may include an antenna array including a plurality of antennas, $Ant_1$-$Ant_{NRX}$, where each antenna exhibits spatial diversity with the other antennas. Base station 102 may utilize the resulting spatial diversity in order to recover each data symbol $x_k$ transmitted by each of $UE_1$-$UE_K$. As shown in further detail in FIG. 2 (only one UE of $UE_1$-$UE_K$ explicitly shown), each antenna $Ant_i$, $i=\{1, 2, \ldots, N_{RX}\}$, may therefore receive a composite wireless signal composed of individual contributions from each of $UE_1$-$UE_K$. For example, each $Ant_i$ may receive a wireless signal given as $h_{i,1}x_1+h_{i,2}x_2+h_{i,3}x_3+ \ldots +h_{i,4}x_4$, where $h_{i,k}$ indicates the channel response between $UE_1$ and $Ant_k$. As denoted in FIG. 2, the channel response vector $h_k$ may denote the channel response between $UE_k$ and each antenna $Ant_1$-$Ant_{NRX}$, i.e. $h_k=[h_{1,k}, h_{2,k}, \ldots, h_{N_{RX},k}]^T$ (where the superscript $A^T$ for arbitrary matrix A denotes the transpose of matrix A).

Base station 102 may therefore receive data symbol vector y composed of $N_{RX}$ total data symbols (one for each antenna $Ant_1$-$Ant_{NRX}$) for the assigned common wireless resource used for data symbols $x_1$-$x_K$, where y is given as follows:

$$y = \sum_{k=1}^{K} y_k = \sum_{k=1}^{K} h_k x_k, \quad (1)$$

where the $i^{th}$ horizontal row of y denotes the wireless signal received by $Ant_i$ as referenced above.

As previously indicated, base station 102 may exploit the spatial diversity between $Ant_1$-$Ant_{NRX}$ to recover data symbols $x_1$-$x_K$ (forming data symbol vector $x=[x_1, x_2, \ldots, x_K]^T$) using reference symbols transmitted by each of $UE_1$-$UE_K$. $UE_1$-$UE_K$ may distribute such reference symbols within the data stream transmitted by each UE. As the reference symbols may be predefined, base station 102 may utilize the reference symbols in order to derive channel estimates for $UE_1$-$UE_K$, i.e. to derive a channel response estimate vector $h_k$ for each $UE_k$. Base station 102 may then apply each $h_k$ to the received symbols y to recover data symbols $x_1$-$x_K$. For example, base station 102 may solve y=Hx for H (or an estimate thereof) in order to recover x from y, where $H=[h_1, h_2, \ldots, h_K]^T$.

It is appreciated that while the scenario detailed above has relied on an assumption that each data symbol $x_1$-$x_K$ originates from a different UE, it may be equally applicable that multiple of data symbols $x_1$-$x_K$ originate from the same UE (i.e. using separate transmitting antennas at the UE), such as in Single User MIMO (SU-MIMO). Such variations are accordingly also embraced herein.

By deriving channel response estimates $\hat{H}$ and applying to $\hat{H}$ to received symbols y, base station 102 may derive K data symbols $x_1$-$x_K$ from the $N_{RX}$ data symbols $y_1$-$y_{N_{RX}}$ originally received at each of $Ant_1$-$Ant_{NRX}$. For example, base station 102 may apply H using minimum mean squares estimation (MMSE) symbol detection to recover $x_1$-$x_K$ from y. As such uplink MIMO schemes may be executed over extended periods of time (with time wireless resources increasing in time and specific frequency resources shared by $UE_1$-$UE_K$ potentially changing), base station 102 may receive a constant stream of data symbols over time. Base station 102 may thus constantly perform data recovery on each set of $N_{RX}$ received data symbols y at a given time t to recover the original K data symbols $x_1$-$x_K$ transmitted by each of $UE_1$-$UE_K$.

The channel estimation procedures for uplink MIMO data recovery may be implemented in a BBU, which may perform symbol detection using the estimated channel matrix $\hat{H}$ in order to recover data symbol estimate $\hat{x}$ while accounting for noise and other interference. The RRU may thus be conventionally tasked with generating the $N_{RX}$ data streams of y (by wireless reception with $Ant_1$-$Ant_{NRX}$, digitalization, and other pre-processing) and transmitting the corresponding data to the BBU over the RRU-BBU interconnection link. The amount of data transmitted between the RRU and BBU may thus be proportional to $N_{RX}$, as the RRU may transmit data corresponding to each of the $N_{RX}$ antennas $Ant_1$-$Ant_{NRX}$.

However, in an advantageous aspect of the disclosure, the RRU may apply a compression filter based on channel estimates in order to reduce the amount of data from $N_{RX}$ proportions to K proportions. As previously detailed, base station 102 may perform data recovery in order to derive K data symbols (i.e. one per user/layer) from $N_{RX}$ total received data symbols (i.e. one per antenna) based on channel estimates $\hat{H}$. Accordingly, the RRU may apply a compression filter similarly based on channel estimation in order to compress the $N_{RX}$ data streams at the RRU into K data streams, and subsequently transmit the K data streams over the RRU-BBU interconnection link. As many such MIMO schemes may use more receive antennas than users/layers, i.e. $N_{RX}$>K (where $N_{RX}$ must satisfy $N_{RX}$≥K for data recovery), such a compression may allow for drastic reduction requirements in data throughput for the RRU-BBU interconnection link. This reduction may be critical for MIMO schemes utilizing upwards of 32 antennas, as $N_{RX}$≥32 may result in unrealizable data throughput. Thin base station architectures may therefore be implemented without the severe drawbacks of link burden in the RRU-BBU interconnection link.

As will be detailed, there exist several base station configurations realizing the aforementioned data compression at the RRU. In a first configuration, an RRU may calculate the compression filter locally, such as based on uplink reference signals received from $UE_1$-$UE_K$. In a second configuration, an RRU may receive an externally-calculated compression filter, such as from a BBU. The RRU may then compress the received MIMO data and transmit the resulting compressed MIMO data to the BBU. There additionally exist multiple options for compression of other related data being transmitted over the RRU-BBU interconnection link, such as compressing the compression filter before transmission from the BBU to the RRU (in the proposed configuration) or compressing reference symbols at the RRU before transmission to the BBU.

The following exemplary descriptions may specifically refer to mobile communication protocols, such as LTE. However, it is appreciated that these descriptions are understood to be demonstrative in nature, and may thus be applied in essentially any MIMO scheme to reduce link burden between two independently located components. Furthermore, while it is appreciated that the related channel estimations are performed using reference signals such as Demodulation Reference Signals (DMRS) and Sounding Reference Signal (SRS), it is understood that such channel estimations may be obtained as a result of other procedures, such as e.g. utilizing a similar reference point to derive a channel estimate. The connected MIMO data compression may thus be employed in a wide range of applications, such as e.g. any number of other mobile communication protocols.

Figure 3:
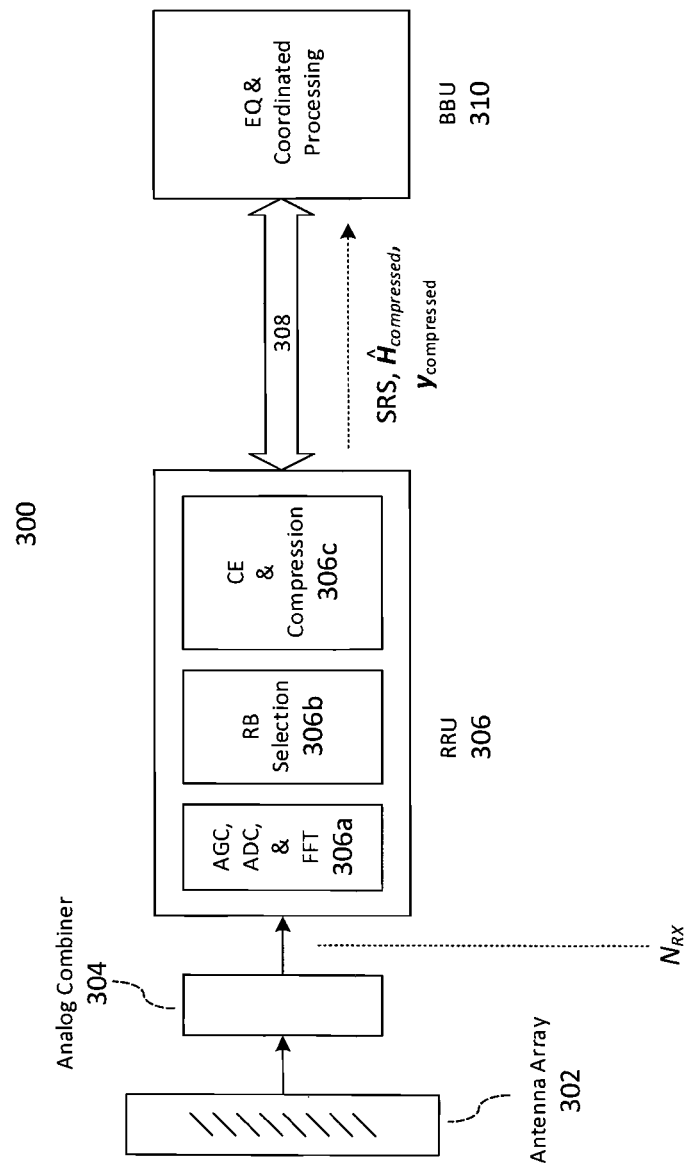
FIG. 3 shows an internal architecture of base station according to an exemplary aspect of the disclosure.

FIG. 3 shows a block diagram illustrating an exemplary internal configuration of base station 300. As will be detailed, base station 300 may be configured according to the first configuration introduced above. Base station 300 may include antenna array 302, analog combiner 304, RRU 306, RRU-BBU interconnection link 308, and BBU 310.

RRU 306 may implement channel estimation in order to effectively compress received uplink MIMO data, thereby reducing link burden on RRU-BBU interconnection line 308 (i.e. consistent with the first configuration). RRU 306 may therefore include AGC, ADC, & FFT hardware 306a, RB selection hardware 306b, and CE & compression hardware 306c.

It is understood that the components of base station 300, in particular RRU 306 and BBU 310 and all internal components thereof (e.g. AGC, ADC, & FFT hardware 306a, RB selection hardware 306b, and CE & compression hardware 306c), may be structurally implemented as hardware, software executed on hardware, or a mixture of hardware and software. Specifically, RRU 306 and BBU 310 may include one or more digital processing circuits, such as logic circuits, processors, microprocessors, Central Processing Units (CPUs), Graphics Processing Units (GPUs) (including General-Purpose Computing on GPU (GPGPU)), Digital Signal Processors (DSPs), Field Programmable Gate Arrays (FPGAs), integrated circuits, Application Specific Integrated Circuits (ASICs), or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of base station 300 components may be detailed herein substantially in terms of functional operation in recognition that a person of skill in the art may readily appreciate the various possible structural realizations of each component that will provide the desired functionality.

Base station 300 may be configured according to a thin base station architecture. In a functional realization of base station 300, antenna array 302, analog combiner 304, and RRU 306 may therefore be placed at a remote location, such as at the top of a tower into which base station 300 is integrated. BBU 310 may be placed at a central location, such as in a base station cabinet. It is appreciated that BBU 310 may serve one or more further RRUs in addition to RRU 306.

RRU 306 may exchange data with BBU 310 over RRU-BBU interconnection link 308, which may be e.g. an optical fiber. While the following description may focus on the uplink path, it is understood that base station 300 may additionally be capable of operating on the downlink path.

Figure 2:
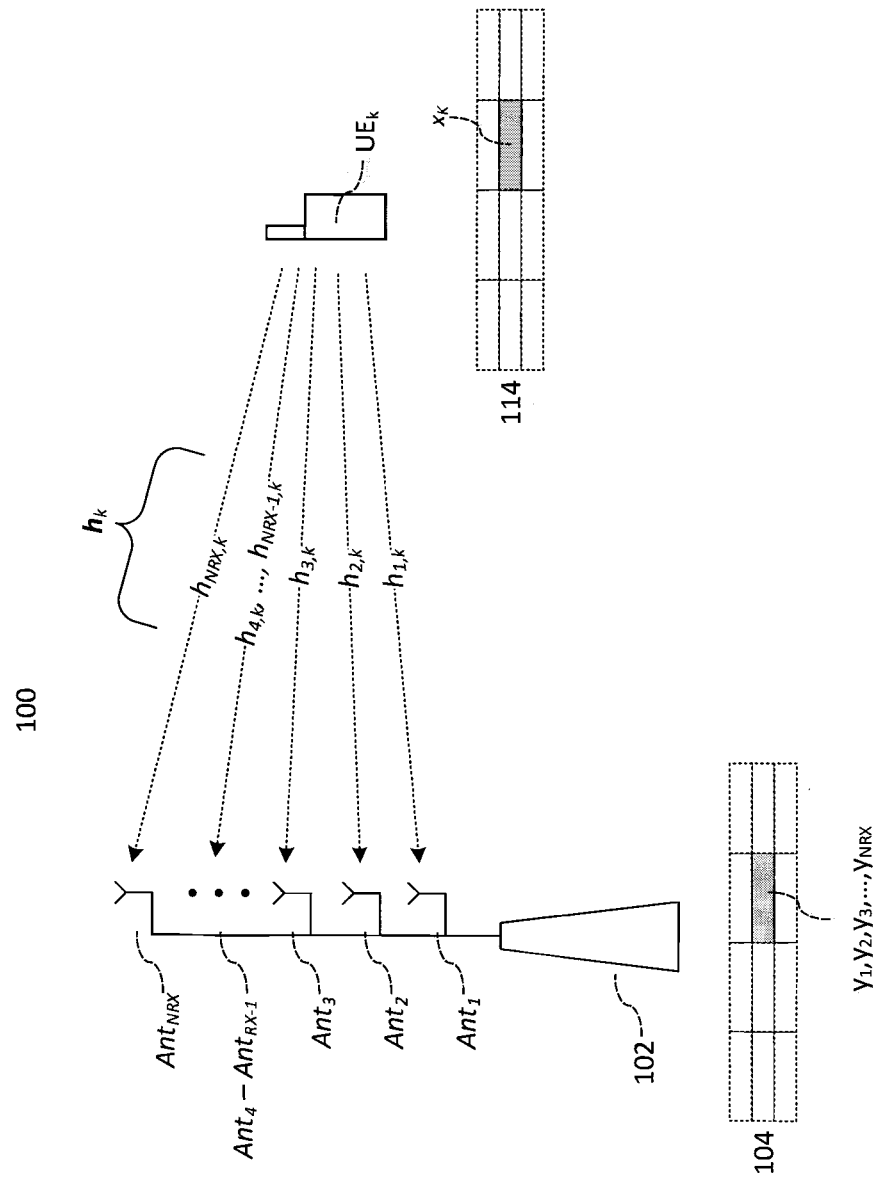
FIG. 2 shows the mobile communication network of FIG. 1 in further detail.

Base station 300 may operate in a substantially similar uplink MIMO scenario as detailed regarding base station 102 of FIGS. 1 and 2. Base station 300 may receive wireless uplink signals from $UE_1$-$UE_K$ according to an uplink MIMO scheme. Base station 300 may receive wireless uplink signals using antenna array 302. Analog combiner 304 may then combine the resulting uplink data signals, such as by combining the uplink data signals from sets of two or antennas of antenna array 302 in the analog domain. Analog combiner 304 may thus yield $N_{RX}$ analog data streams (as indicated in FIG. 3), which may be subsequently received by RRU 306. $N_{RX}$ may thus indicate the number of analog data streams produced by analog combiner 306, which may be equal to or less than the actual number of physical receive antennas in antenna array 302.

RRU 306 may process the analog data streams received from analog combiner 306 using processing circuitry. RRU 306 may perform automatic gain control (AGC) and analog-to-digital conversion (ADC) on the $N_{RX}$ analog data streams received from analog combiner 304 and subsequently perform Fast Fourier Transform (FFT) processing in order to generate frequency domain symbols (AGC, ADC, & FFT hardware 306a). RRU 306 may then perform resource block (RB) selection to eliminate null subcarriers in the uplink signals (RB selection hardware 306b). Per uplink symbol period, RRU 306 may thus obtain $N_{RX}$ received uplink MIMO data symbols y (expressed herein as a vector), as previously detailed regarding FIGS. 1 and 2 and Equation 1.

RRU 306 may therefore further include CE and compression hardware 306c, which may be composed of digital processing circuitry. RRU 306 may thus require extra calculation and processing hardware, which may be utilized in order to perform channel estimation and calculate compression filters.

RRU 306 may then transmit resulting data to BBU 310 over RRU-BBU interconnection link 308. BBU 310 may receive the data and perform equalization and coordinated processing. BBU 310 may be composed of processing circuitry.

Base station 300 may be configured according to the first configuration introduced above, where RRU 306 may be configured to locally calculate the compression filter. The operation of base station 300 may be summarized as follows:

a. Perform channel estimation at RRU 306 on received symbol vector y to obtain estimated channel response matrix $\hat{H}$ b. Compress received symbol at RRU 306 vector y using $\hat{H}$ to generate compressed received symbol vector $y_{compressed}$ and compressed estimated channel response matrix $H_{compressed}$ c. Transmit $y_{compressed}$ and $\hat{H}_{compressed}$ (along with received SRS symbols) from RRU 306 to BBU 310 over RRU-BBU interconnection link 308 d. Perform symbol detection at BBU 310 using $y_{compressed}$ and $\hat{H}_{compressed}$ to generate detected symbol vector $\hat{x}$ The compression performed by RRU 306 may be lossless, and thus may offer decreased link burden on RRU-BBU interconnection link 308 without performance degradation.

As detailed regarding FIG. 1 and FIG. 2, base station 300 may implement an uplink MIMO scheme in order to receive uplink data from $UE_1$-$UE_K$ using shared uplink wireless (time and frequency) resources. $UE_1$-$UE_K$ may each transmit reference signals along with uplink traffic and control data, such as e.g. by transmitting reference signals during certain symbol periods (i.e. by multiplexing reference symbols within an uplink data stream also containing traffic and control data symbols).

For example, in an LTE network configuration, $UE_1$-$UE_K$ may each transmit DMRS symbols, such as by time-multiplexing DMRS symbols into an uplink data stream containing further data symbols. DMRS may then be utilized in order to wireless obtain channel estimates and recover data, as previously detailed. $UE_1$-$UE_K$ may only transmit DMRS when the UE is actively transmitting additional uplink data, such as in uplink time periods (e.g. uplink subframes) when the UE is scheduled to transmit uplink data.

$UE_1$-$UE_K$ may also transmit SRS, which similarly may be transmitted as reference symbols time-multiplexed with other uplink traffic and data symbols. In contrast to DMRS, $UE_1$-$UE_K$ may transmit SRS symbols during each uplink subframe, i.e. regardless if the UE is scheduled to transmit uplink data. For example, $UE_1$-$UE_K$ may transmit SRS symbols during the last symbol period of each uplink subframe.

In an LTE network configuration, each $UE_1$-$UE_K$ may therefore transmit DMRS and SRS symbols along with further uplink data symbols during each uplink subframe.

Specifically, $UE_1$-$UE_K$ may transmit Physical Uplink Shared Channel (PUSCH) data symbols containing traffic and Physical Uplink Control Channel (PUCCH) data symbols containing control data. In the uplink MIMO schemes detailed herein, uplink MIMO may be utilized in order to multiplex at least PUSCH data symbols from each of $UE_1$-$UE_K$ onto shared wireless resources, thereby conserving wireless resources and potentially increasing uplink data rates. However, it is appreciated that the teachings detailed herein may be similarly applied to communication protocols other than LTE. Other communication protocols using MIMO based on reference symbols may be particularly applicable.

RRU 306 may utilize DMRS symbols received from $UE_1$-$UE_K$ in order to perform channel estimation and subsequent compression on uplink data from $UE_1$-$UE_K$. As previously detailed regarding FIGS. 1 and 2, the channel response characterizing the wireless channel between a given $UE_k$ and the $N_{RX}$ receive antennas may be denoted as $h_k = [h_{1,k}, h_{2,k}, \ldots, h_{N_{RX},k}]^T$ (refer also to Equation 1). As the DRMS symbols transmitted by $UE_1$-$UE_K$ are predefined and time-multiplexed along with other uplink data symbols, RRU 306 may isolate the DMRS symbols and apply channel estimation processing (i.e. utilizing the predefined DMRS symbol sequences as pilot symbols to obtain attenuation and phase rotation of the DRMS symbols) in order to obtain an estimated channel response vector $\hat{h}_k = [\hat{h}_{1,k}, \hat{h}_{2,k}, \ldots, \hat{h}_{N_{RX},k}]^T$ for each $UE_k$ of $UE_1$-$UE_K$, where each element $h_{i,k}$, $i = \{1, \ldots, N_{RX}\}$ denotes the estimated channel response between $UE_k$ and the $i^{th}$ receive antenna $Ant_i$ of antenna array 302 (or e.g. grouped set of combined antennas in the event of analog combination at analog combiner 304). It is appreciated that each channel response estimate $\hat{h}_{i,k}$ may be realized as a vector, such as a vector containing estimated channel response coefficients characterizing each associated wireless channel.

As previously detailed, base station 300 may receive $N_{RX}$ data symbols in received data symbol vector y for each uplink MIMO symbol period, where $y = \sum_{k=1}^{K} = \sum_{k=1}^{K} h_k x_k$ as detailed regarding Equation 1.

RRU 306 may subsequently compress received data symbol vector y by applying estimated channel response vector $\hat{h}_k$ to generate compressed received symbol vector $y_{compressed}$, where $y_{compressed}$ contains only K elements as opposed to the $N_{RX}$-element y.

Specifically, RRU 306 may calculate the following (i.e. at Channel Estimation (CE) and compression hardware 306c):

$$y_{compressed} = [\hat{h}_1, \hat{h}_2, \ldots, \hat{h}_K]^H y \quad (2),$$

where $A^H$ denotes the Hermitian transpose of A.

As opposed to sending data proportional to $N_{RX}$ corresponding to y during each uplink symbol period, RRU 306 may instead send data proportional to K in the form of $y_{compressed}$ to BBU 310 over RRU-BBU interconnection link 308.

By such compression using channel estimation within RRU 306, the data link rate for RRU-BBU interconnection link 308 may thus be drastically reduced, in particular in massive MIMO schemes where large quantities of receive antennas (i.e. 32 or more) are used to receive uplink data from a relatively smaller quantity of users (i.e. 8 or less).

RRU 306 may additionally transmit a compressed estimated channel response matrix $\hat{H}_{compressed}$ (where $y_{compressed} = H_{compressed} x$) to BBU 310 to allow BBU 310 to perform further equalization to eliminate inter-UE interference, thereby improving final symbol detection results. As previously detailed, base station 300 may seek to recover data symbols $x_1$-$x_K$ of data symbol vector x (where $x = [x_1, x_2, \ldots, x_K]^T$). Base station 300 may therefore recover a detected data symbol vector x.

RRU 306 may also calculate compressed estimated channel response matrix $\hat{H}_{compressed}$ based on DMRS symbols from $UE_1$-$UE_K$ as follows:

$$\hat{H}_{compressed} = [\hat{h}_1, \hat{h}_2, \ldots, \hat{h}_K] \times [\hat{h}_1, \hat{h}_2, \ldots, \hat{h}_K] \quad (3).$$

In summary, RRU 306 may determine estimated channel response matrix $\hat{H}$ based on DMRS symbols received from $UE_1$-$UE_K$, where $\hat{H}$ estimates the wireless channel response between each $UE_1$-$UE_K$ and each $Ant_1$-$Ant_{NRX}$. RRU 306 may then compress received data symbol vector y based on estimated channel response matrix $\hat{H}$ to generate compressed received data symbol vector $y_{compressed}$. RRU 306 may similarly determine compressed estimated channel response matrix $\hat{H}_{compressed}$ based on estimated channel response matrix $\hat{H}$.

RRU 306 may then transmit $\hat{H}_{compressed}$ and $y_{compressed}$ to BBU 310 over RRU-BBU interconnection link 308. As received symbol data has been reduced from dimension $N_{RX}$(y) to dimension K ($y_{compressed}$), link burden on RRU-BBU interconnection link 308 is reduced. As depicted in FIG. 3, RRU 306 may also transmit SRS data symbols for $UE_1$-$UE_K$ to BBU 310, which BBU 310 may utilize for channel estimation in frequency dependent scheduling.

BBU 310 may then recover the transmitted data symbols x corresponding to $UE_1$-$UE_K$ for a given symbol period by performing symbol detection to obtain $\hat{x}$ using Minimum Mean Squared Error (MMSE) equalization as follows:

$$\hat{x} = (\hat{H}_{compressed} + \sigma_n^2 I)^{-1} y_{compressed} \quad (4),$$

where $\sigma_n^2$ is the noise variance and I is the identity matrix.

The compression scheme detailed thus far proves to be a lossless compression scheme, and thus achieves identical performance to non-compressed schemes. Specifically, in the non-compressed scheme, RRU 306 may transmit uncompressed received data symbol vector y to BBU 310 over RRU-BBU interconnection link 308, where y satisfies the relationship provided in Equation 1. RRU 306 may additionally transmit DMRS and SRS data symbols for $UE_1$-$UE_K$ to BBU 310. BBU 310 may then perform channel estimation based on DMRS symbols for $UE_1$-$UE_K$ in order to obtain estimated channel response matrix $\hat{H}$ as follows:

$$\hat{H} = \begin{bmatrix} \hat{h}_{1,1} & \hat{h}_{2,1} & \ldots & \hat{h}_{N_{RX},1} \\ \hat{h}_{1,2} & \ldots & \ldots & \hat{h}_{N_{RX},2} \\ \ldots & \ldots & \ldots & \ldots \\ \hat{h}_{1,K} & \ldots & \ldots & \hat{h}_{N_{RX},K} \end{bmatrix}_{[K \times N_{RX}]} \quad (5)$$

BBU 310 may then apply $\hat{H}$ to recover x in the form of $\hat{x}$ using MMSE equalization as follows:

$$\hat{x} = (\hat{H}^H \hat{H} + \sigma_n^2 I)^{-1} \hat{H} y \quad (6).$$

Applying the identities $\hat{H}_{compressed} = \hat{H}^H \hat{H}$ and $y_{compressed} = \hat{H} y$, Equation 6 may be rewritten as:

$$\hat{x} = (\hat{H}_{compressed} + \sigma_n^2 I)^{-1} y_{compressed} \quad (7).$$

Accordingly, the architecture of base station 300 as shown in FIG. 3 proves lossless due to the resulting equivalence of detected symbol vector $\hat{x}$ in Equation 4 and Equation 7.

By performing compression on user data at RRU 306, base station 300 may compress data traffic on RRU-BBU interconnection link 308 from antenna number-proportional to user-proportional, such as by compressing PUSCH data contained in y corresponding to $UE_1$-$UE_K$ in an LTE configuration. Performing such compression of PUSCH data to transmit $y_{compressed}$ in place of y results in a compression ratio of $$\frac{11}{14} \frac{K}{N_{RX}}.$$

As detailed above, RRU 306 may transmit $\hat{H}_{compressed}$ and SRS symbols in addition to $y_{compressed}$ over RRU-BBU interconnection link 308. Base station 300 may achieve further compression on data transmitted on the RRU-BBU interconnection link 308 by additionally compressing $\hat{H}_{compressed}$ at RRU 306 before transmission to BBU 310. As given by Equation 3 detailing the calculation of $\hat{H}_{compressed}$ from $\hat{H}$, $\hat{H}_{compressed}$ is a Hermitian matrix, thereby satisfying $\hat{H}_{compressed}(i,j)=\hat{H}^*_{compressed}(j,i)$ (where the notation A* denotes the complex conjugate of A). Accordingly, the upper triangular matrix of $\hat{H}_{compressed}$ is sufficient to recover $\hat{H}_{compressed}$. RRU 306 may therefore transmit the upper triangular matrix of $\hat{H}_{compressed}$ to BBU 308, thereby achieving a compression ratio of nearly 0.5 for transmission of $\hat{H}_{compressed}$.

RRU 306 may utilize Discrete Cosine Transform (DCT) DCT truncation in order to further compress $\hat{H}_{compressed}$. DCT truncation may be applied to transform estimation channel response information from the frequency domain to the DCT domain if a UE is assigned at several consecutive carriers. The effective length of the resulting DCT-domain sequence (i.e. along the x-axis) may thus be substantially shorter than the corresponding frequency-domain sequence, and thus may be truncated in order to further compress the associated data.

Figure 4B:
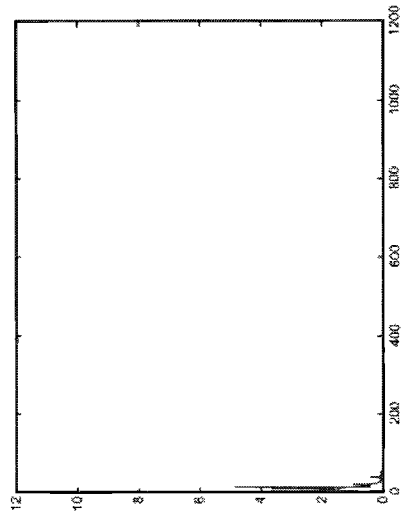
FIGS. 4A-4C show several charts illustrating Discrete Cosine Transform (DCT) truncation.
Figure 4A:
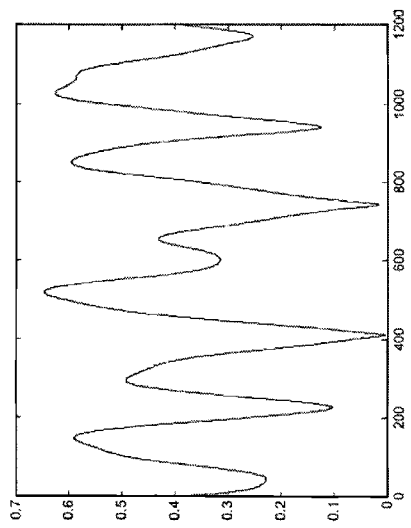
Figure 4C:
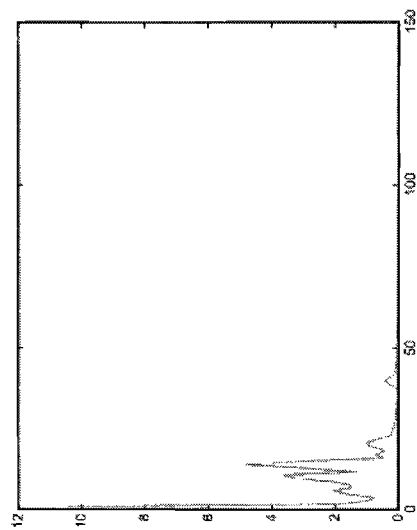

FIGS. 4A-4C illustrate an example of such DCT-domain truncation compression. FIG. 4A shows an exemplary plot of channel response data in the frequency domain. As clearly discernible in FIG. 4A, the frequency-domain sequence contains essential information along the entirety of the plotted x-axis. Performing truncation at any point of the frequency domain sequence would inevitably result in the loss of critical data, thereby introducing significant loss into such a compression procedure.

However, the same frequency-domain sequence may be transformed into the DCT-domain, as illustrated in FIG. 4B (note the equivalent scale in x-axis between FIG. 4A and FIG. 4B). As shown in FIG. 4B, the DCT-domain sequence attenuates to nearly zero amplitude along the x-axis. The DCT-domain sequence may thus be truncated with minimal loss, such as shown in FIG. 4C. The resulting truncated DCT-domain sequence may thus be substantially shorter than the corresponding frequency-domain sequence.

RRU 306 may therefore perform DCT truncation on $\hat{H}_{compressed}$ before transmission over RRU-BBU interconnection link 308, thereby achieving a compression ratio of 0.125. RRU 306 may additionally or alternatively perform upper triangular matrix compression on $\hat{H}_{compressed}$ (i.e. by selecting to transmit the elements of $\hat{H}_{compressed}$ appearing in the upper triangle). RRU 306 may achieve a combined compression ratio of 0.06 by applying both DCT truncation and upper triangular matrix compression on $\hat{H}_{compressed}$, thereby further reducing link burden on RRU-BBU interconnection link 308.

The first configuration detailed above as realized in base station 300 may substantially reduce data throughput requirements on RRU-BBU interconnection link 308 by compressing user data using a compression filter derived from channel response estimates calculated at RRU 306. RRU 306 may further reduce link burden by additionally compressing the compression filter for transmission to BBU 310. The resulting compression scheme may be lossless (i.e. in the case of user data compression and upper triangular matrix compression) or nearly lossless (i.e. with minimal loss incurred by truncation of channel response data in the DCT-domain).

In the second configuration introduced above, the RRU may similarly perform compression using a compression filter derived from channel response estimates. However, in order to realize a "thinner" RRU architecture (i.e. less components at the RRU), the channel estimation and related compression filter calculation may instead be performed at the BBU. The BBU may then transmit the appropriate compression filter to the RRU, which may apply the compression filter to received user data and transmit the resulting compressed data to the BBU over the RRU-BBU interconnection link.

Figure 5:
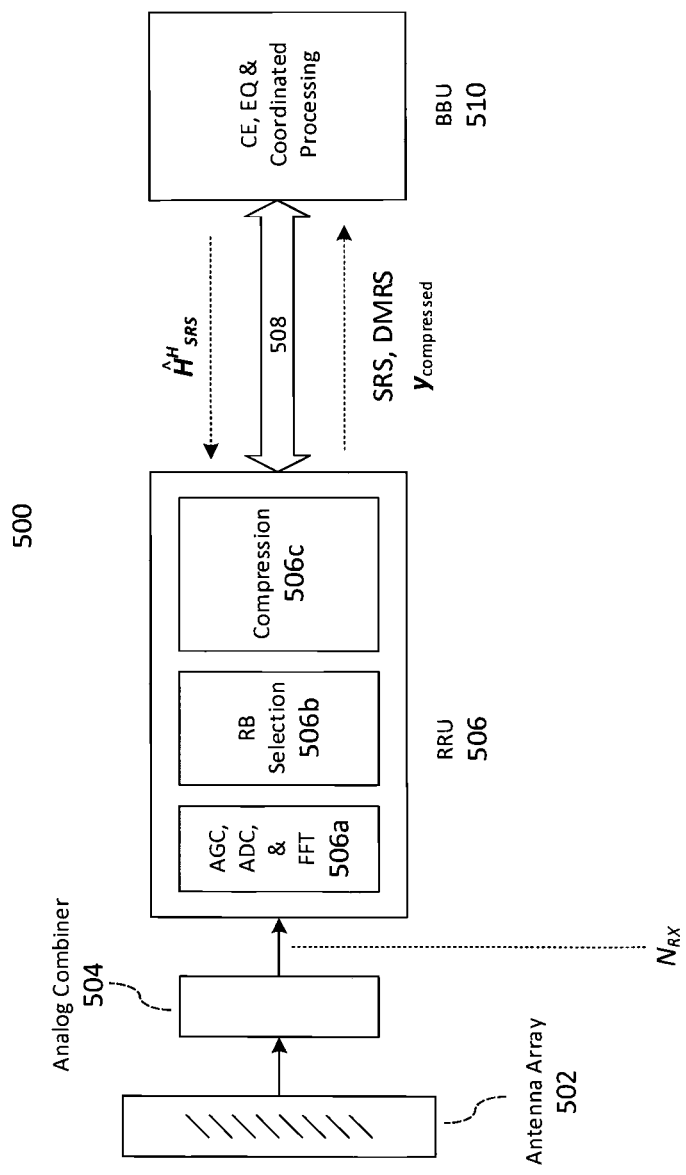
FIG. 5 shows an internal architecture of base station according to a further exemplary aspect of the disclosure.

FIG. 5 shows a block diagram illustrating an exemplary internal configuration of base station 500. Base station 500 may be configured according to the second configuration introduced above. Base station 500 may include antenna array 502, analog combiner 504, RRU 306, RRU-BBU interconnection link 508, and BBU 310. It is appreciated that antenna array 502 and analog combiner 504 may operate with substantially the same functionality as detailed regarding antenna array 302 and analog combiner 304 of base station 300.

It is understood that the components of base station 500, in particular RRU 506 and BBU 510 and all internal components thereof (e.g. AGC, ADC, & FFT hardware 506a, RB selection hardware 506b, and compression hardware 506c), may be structurally implemented as hardware, software executed on hardware, or a mixture of hardware and software. Specifically, RRU 506 and BBU 510 may include one or more digital processing circuits, such as logic circuits, processors, microprocessors, Central Processing Units (CPUs), Graphics Processing Units (GPUs) (including General-Purpose Computing on GPU (GPGPU)), Digital Signal Processors (DSPs), Field Programmable Gate Arrays (FPGAs), integrated circuits, Application Specific Integrated Circuits (ASICs), or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of base station 500 components may be detailed herein substantially in terms of functional operation in recognition that a person of skill in the art may readily appreciate the various possible structural realizations of each component that will provide the desired functionality.

In contrast to base station 300, BBU 510 may implement channel estimation in order to calculate and provide a compression filter to RRU 506, which RRU 506 may then apply in order to compress received data symbol vector y into compressed received data symbol vector $y_{compressed}$. Accordingly, RRU 506 may include AGC, ADC, & FFT hardware 506a, RB selection hardware 506b, and compression hardware 506c, while BBU 310 may include CE, EQ, and coordinated processing hardware. RRU 506 and BBU 510 may each be implemented using processing circuitry. RRU 506 may thus be realized with a "thinner" design, as all complex channel estimation processing hardware has been moved to BBU 310. It is appreciated that include AGC, ADC, & FFT hardware 506a and RB selection hardware 506b of RRU 506 may therefore operate with substantially the same functionality as detailed regarding AGC, ADC, & FFT hardware 206a and RB selection hardware 306b of RRU 506. Due to a slightly modified compression scheme, RRU-BBU interconnection link 508 may similarly operate with substantially the same functionality as RRU-BBU interconnection link 308 except for potential minor modifications related to differing data throughput support. BBU 510 may include additional channel estimation hardware and may retain substantially the same functionality of BBU 310.

The operation of base station 500 according to the second configuration may be summarized as follows:

a. Perform channel estimation at BBU 510 on previous received symbol vector y (previously provided by RRU 506) to obtain estimated channel response matrix $\hat{H}_{SRS}^H$ b. (Optional: Perform compression on compression filter at BBU 510)

c. Transmit compression filter (based on estimated channel response matrix $\hat{H}_{SRS}^H$ and optionally $\hat{H}_{DMRS}$) from BBU 510 to RRU 506 over RRU-BBU interconnection link 508 d. Compress current received symbol vector y at RRU 506 using $\hat{H}_{SRS}^H$ to generate compressed received symbol vector $y_{compressed}$ e. Transmit $y_{compressed}$ (including received SRS and DMRS symbols) from RRU 506 to BBU 510 over RRU-BBU interconnection link 508 f. Determine compressed estimated channel response matrix $\hat{H}_{compressed}$ at BBU 510 and perform symbol detection using $y_{compressed}$ and $\hat{H}_{compressed}$ to generate detected symbol vector $\hat{x}$ As BBU 510 is responsible for computing estimated channel response matrix $\hat{H}_{SRS}^H$ (applied as the compression filter by RRU 506) in base station 500, there may exist a slight delay in computation of the compression filter at BBU 510 and the application time of the compression filter by RRU 506. Accordingly, BBU 510 may utilize SRS symbols instead of DMRS symbols in order to determine compression filter $\hat{H}_{SRS}^H$, as $UE_1$-$UE_K$ may only transmit DMRS during uplink subframes scheduled for user data transmission (i.e. PUSCH data for LTE network configurations). SRS symbols may in contrast be available during each uplink subframe, regardless of scheduled user data transmission.

BBU 510 may determine estimated channel response matrix $\hat{H}_{SRS}^H$ based on SRS symbols, which may be initially received by RRU 506 and subsequently transmitted to BBU 508. BBU 510 may therefore extend the use of SRS data symbols past the conventional application of frequency dependent scheduling (channel quality measurement) in order to apply SRS symbols for channel response estimation and compression filter calculation.

As denoted in FIG. 5, BBU 510 may provide RRU 506 with estimated channel response matrix $\hat{H}_{SRS}^H$ over RRU-BBU interconnection link 508, which RRU 506 may apply to received symbol vector y as a compression filter to generate compressed received symbol vector $y_{compressed}$.

RRU 506 may provide BBU 510 with SRS symbols, DMRS symbols (compressed or uncompressed, as will be detailed), and $y_{compressed}$. BBU 510 may then utilize the DMRS symbols in addition to $\hat{H}_{SRS}^H$ (as previously calculated at BBU 510) to perform symbol detection on compressed received symbol vector $y_{compressed}$ received from RRU 506 to obtain detected symbol vector x. BBU 510 may also apply the SRS symbols (and optionally DMRS symbols) to update compression filter $\hat{H}_{SRS}^H$ for future use by RRU 506 to compress subsequent received symbol vector y. BBU 510 may continuously calculate the compression filter ($\hat{H}_{SRS}^H$ or $\hat{H}_{comb}$) and provide the compression filter to RRU 506 for application in compression.

Base station 500 may utilize an initialization period, as the initially received SRS (and/or DMRS) symbols and symbol vector(s) y may need to first be provided to BBU 510 for compression filter calculation before RRU 506 may begin effectively compressing further received symbol vectors y using the compression filter.

Accordingly, RRU 506 may receive initial SRS symbols from $UE_1$-$UE_K$ using the $N_{RX}$ data streams corresponding to antenna array 502 and analog combiner 504. RRU 506 may provide the SRS symbols to BBU 510 over RRU-BBU interconnection link 508.

BBU 510 may then calculate compression filter $\hat{H}_{SRS}^H$ (i.e. estimated channel response matrix based on SRS) to be utilized for data compression at RRU 506 using the received SRS symbols. It is appreciated that alternative procedures may be implemented in order to calculate such a compression filter, which may depend on e.g. reference symbols utilized in a particular mobile communication protocol.

BBU 510 may calculate $\hat{H}_{SRS}^H$ in a similar manner as detailed regarding base station 300. BBU 510 may obtain the estimated channel response vector $\hat{h}_{k,SRS}$ for each $UE_k$ of $UE_1$-$UE_K$, where $\hat{h}_{k,SRS}=[\hat{h}_{1,k,SRS}, \hat{h}_{2,k,SRS}, \ldots \hat{h}_{N_{RX},k,SRS}]^T$ (where each element $h_{j,k,SRS}$ denotes the estimated channel response based on SRS between $UE_k$ and $Ant_j$).

BBU 510 may then obtain $\hat{H}_{SRS}^H$ as follows:

$$\hat{H}_{SRS[N_{RX} \times K]}{}^H = [\hat{h}_{1,SRS}, \hat{h}_{2,SRS}, \ldots, \hat{h}_{K,SRS}]^H \quad (8).$$

BBU 510 may then transmit $\hat{H}_{SRS}^H$ to RRU 506 over RRU-BBU interconnection link 508. Upon receiving $\hat{H}_{SRS}^H$, RRU 506 may then apply $\hat{H}_{SRS}^H$ to received symbol vector y received from $UE_1$-$UE_K$ (i.e. at compression hardware 506c) in order to compress y to $y_{compressed}$. It is appreciated that the procedure detailed above may be implemented continuously, where BBU 510 constantly computes and transmits compression filter $\hat{H}_{SRS}^H$ to RRU 506. This procedure may be thus be utilized to update compression filter $\hat{H}_{SRS}^H$ at RRU 506 over time.

RRU 506 may apply compression filter $\hat{H}_{SRS}^H$ to compress y as follows:

$$y_{compressed} = \hat{H}_{SRS}^H \times y \quad (9).$$

Resulting compressed received symbol vector $y_{compressed}$ may thus be of dimension K×1, thereby substantially compressing user data (e.g. PUSCH data) from antenna number-proportional to user number-proportional, which may be particular advantages in MIMO schemes where $N_{RX} \gg K$.

RRU 506 may then transmit $y_{compressed}$ to BBU 510 over RRU-BBU interconnection link 508. In order to perform symbol detection directly on $y_{compressed}$, BBU 510 may derive compressed estimated channel response matrix $\hat{H}_{compressed}$ (where $y_{compressed} = \hat{H}_{compressed} x$). BBU 510 may obtain an accurate compressed estimated channel response matrix $\hat{H}_{compressed}$ based on DMRS symbols, i.e. where the DMRS symbols directly correspond to the data symbols of x and y (i.e. in time). As previously indicated, RRU 506 may supply BBU 510 with DMRS symbols in addition to SRS symbols and $y_{compressed}$.

RRU 506 may either transmit the DMRS symbols in compressed or uncompressed form over RRU-BBU interconnection link 508, thereby offering two alternatives for the second configuration. Uncompressed DMRS transmission may offer performance advantages over compressed DMRS transition while inherently resulting in greater link burden onto RRU-BBU interconnection link 508. Conversely, compressed DMRS transmission may require increased data transmission rates while introducing performance loss.

In the uncompressed DMRS transmission scheme of the second configuration, RRU 506 may transmit DMRS symbols to BBU 510 over RRU-BBU interconnection link 508 without compression. RRU 506 may extract the DMRS symbols (and SRS symbols) from the received data stream using time selection, i.e. by de-multiplexing the reference symbols from the other uplink data contained.

BBU 510 may then estimate the channel response information in the form of DMRS estimated channel response matrix $\hat{H}_{DMRS}$ of dimension $N_{RX} \times K$. BBU 510 may then determine compressed estimated channel response matrix $\hat{H}_{compressed}$ from $\vec{H}_{DMRS}$ and $\hat{H}_{SRS}^H$ (already available at BBU 510) as follows:

$$\hat{H}_{compressed} = \hat{H}_{SRS}^H \times \hat{H}_{DMRS} \quad (10).$$

BBU 510 may then apply resulting compressed estimated channel response matrix $\hat{H}_{compressed}$ to perform symbol detection directly on $y_{compressed}$, i.e. as previously detailed regarding Equation 4. BBU 510 may thus obtain detected symbol vector $\hat{x}$ corresponding to x.

An additional potential feature of uncompressed DMRS transmission in the second configuration is the ability to "refine" the compression matrix utilized by RRU 506 for compression of y. As previously detailed, BBU 510 may calculate and provide SRS estimated channel response matrix $\hat{H}_{SRS}^H$ to RRU 506 for compression, thereby relying on the constant availability of SRS symbols compared to the intermittent availability of DMRS symbols.

However, BBU 510 may additionally perform refinements to the compression filter provided to RRU 506, such as by refining $\hat{H}_{SRS}^H$ according to subsequently obtained DMRS symbols. BBU 510 may provide combined compression filter $\hat{H}_{comb}^H$ to RRU 506, where $\hat{H}_{comb}$ is given as follows:

$$\hat{H}_{comb} = f_0(\hat{H}_{SRS}) + f_1(\hat{H}_{DMRS}) \quad (11),$$

where $f_0(\ )$ and $f_1(\ )$ are mapping functions.

BBU 510 may therefore perform real-time refinement of the compression filter, thereby refining $\hat{H}_{comb}$ to closely match the ideal compression filter due to the increased accuracy offered by DMRS channel response estimation. BBU 510 may continuously transmit $\hat{H}_{comb}$ to RRU 506, such as by updating $\hat{H}_{comb}$ as newly obtained SRS and DMRS symbols are obtained. System performance may thus be further improved.

The uncompressed DMRS transmission scheme of the second configuration may therefore produce a compression ratio of $$\frac{11}{14}\frac{K}{N_{RX}} + \frac{3}{14}$$

in an LTE network configuration, corresponding to the distribution of DMRS, SRS, and PUSCH symbols in uplink subframes (11 compressed PUSCH symbols with 3 uncompressed SRS and DMRS symbols per uplink sub frame).

In the compressed DMRS transmission scheme of the second configuration, RRU 506 may compress received DMRS symbols before transmission to BBU 510 over RRU-BBU interconnection link 508. RRU 506 may apply the same compression filter $\hat{H}_{SRS}^H$ supplied by BBU 510 for compression of DMRS symbols, thereby compressing DMRS symbols from $N_{RX}$ dimension to K dimension.

BBU 510 thus requires compressed estimated channel response matrix $\hat{H}_{compressed}$ of dimension $K \times K$ to perform symbol detection directly on $y_{compressed}$ to yield $\hat{x}$. BBU 510 may derive $\hat{H}_{compressed}$ directly from the compressed DMRS symbols.

The compressed DMRS transmission scheme of the second configuration thus yields a compression ratio of $$\frac{13}{14}\frac{K}{N_{RX}} + \frac{1}{14}$$

(corresponding to 1 compressed SRS symbol and 13 compressed DMRS/PUSCH symbols per uplink subframe).

In addition to compressing data transmitted on RRU-BBU interconnection link 508 from RRU 506 to BBU 510, base station 500 may additionally compress data transmitted from BBU 510 to RRU 506 on RRU-BBU interconnection link 508. Specifically, BBU 510 may perform compression on the compression matrix. As transmission of uncompressed compression filters may impose significant link burden on RRU-BBU interconnection link 508, transmission of compressed compression filters from BBU 510 to RRU 506 may reduce the requisite data throughput level. As detailed above, such may be particularly advantageous in scenarios where large numbers of receive antennas (corresponding to large $N_{RX}$) are employed.

BBU 508 may represent the compression matrix by determining pre-filtering (i.e. compression) elements for each subcarrier between $UE_k$ of $UE_1$-$UE_K$ and $Ant_i$ of $N_{RX}$ receive antennas $Ant_i$-$Ant_{N_{RX}}$ as follows:

$$\omega_{k,i} = [\omega_{1,k,i}, \omega_{2,k,i}, \ldots, \omega_{N_{SC},k,i}]^T \quad (12),$$

where $N_{SC}$ gives the total number of uplink subcarriers utilized by $UE_k$.

BBU 510 may calculate pre-filtering vectors $\omega_{k,i}$, $k=\{1, \ldots, K\}$ and $i=\{1, \ldots, N_{RX}\}$ to provide to RRU 506 over RRU-BBU interconnection link 508 to apply as the compression filter for compression of y. Uplink MIMO schemes employing large numbers of antennas must therefore support high link burden on RRU-BBU interconnection link 508 in the RRU to BBU direction, which may similarly not be practically realizable in many base station configurations.

BBU 510 may therefore compress each $\omega_{k,i}$ based on the correlation between adjacent subcarriers. BBU 510 may thus compress each $\omega_{k,i}$ from dimension $N_{SC}$ to dimension $N_{compressed}$, where the value of $N_{compressed}$ depends on the particular compression scheme applied by BBU 510. BBU 510 may therefore include additional compression hardware configured to implement any number of a variety of compression schemes. The various compression schemes may provide tradeoffs between performance (i.e. loss) and link burden.

In particular, BBU 510 may apply a delta encoding compression scheme or linear interpolation encoding scheme in order to compress each $\omega_{k,i}$ for transmission over RRU-BBU interconnection link 508. The delta encoding compression scheme may provide better performance (i.e. reduced loss) than the linear interpolation scheme with a lower relative compression ratio. Both compression schemes may thus be advantageous over uncompressed transmission schemes, particularly when a large number of receive antennas are employed (i.e. massive uplink MIMO scheme with high $N_{RX}$).

In the delta encoding scheme, BBU 510 may transmit an absolute pre-filtering element as a reference among every N consecutive subcarriers of each $\omega_{k,i}$. BBU 510 may select the reference element position as being in the middle of every N subcarriers, and may transmit the remaining N pre-filtering elements as increment values (i.e. delta values) relative to the adjacent subcarrier. In order to avoid cumulative error, BBU 510 may use the formula $d_n = x_n - \hat{x}_{n-1}$ as opposed to $d_n = x_n - \hat{x}_{n-1}$ for the increment elements, where $\hat{x}_{n-1}$ is the recovered information of $x_{n-1}$.

Assuming $N = N_{SC} = 12$, the original pre-filtering vector $\omega_{k,i}$ can be expressed as follows:

$$\omega_{k,i} = [\omega_{1,k,i}, \omega_{2,k,i}, \ldots, \omega_{6,k,i}, \ldots, \omega_{11,k,i}, \omega_{12,k,i}]^T \quad (13).$$

As BBU 510 has knowledge of the compression scheme, BBU 510 can additionally calculate the elements of each pre-filtering vector $\omega_{k,i}$ as will be recovered at RRU 506. The recovered pre-filtering vector $\hat{\omega}_{k,i}$ may be expressed as follows:

$$\hat{\omega}_{k,i} = [\hat{\omega}_{1,k,i}, \hat{\omega}_{2,k,i}, \ldots \hat{\omega}_{6,k,i}, \ldots, \hat{\omega}_{11,k,i}, \hat{\omega}_{12,k,i}]^T \quad (14).$$

In order to prevent error spread, BBU 510 may calculate the increment adjacent pre-filtering elements of $\omega_{k,i}$ according to the recovered pre-filtering elements as opposed to the ideal elements. BBU 510 may thus calculate pre-filtering vector to $\omega_{k,i,delta}$ as the follows:

$$\omega_{k,i,delta} = [d_{l1,k,i}, \ldots, d_{l5,k,i}, \omega_{6,k,i}, d_{r7,k,i}, \ldots, d_{r12,k,i}]^T \quad (15),$$

where $d_{lj,k,i} = \omega_{j,k,i} - \hat{\omega}_{j+1,k,i}$ and $d_{rj,k,i} = \omega_{j,k,i} - \omega_{j-1,k,i}$.

BBU 510 may then quantize each increment variable $d_{lj,k,i}$ and $d_{rj,k,i}$ of $\omega_{k,i,delta}$ using Huffman compression, thereby reducing the number of requisite transmission bits for each $d_{lj,k,i}$ and $d_{rj,k,i}$. For example, each element $d_{lj,k,i}$ and $d_{rj,k,i}$ may be reduced by 2.89 bits in an implementation utilizing 16 bits for each element of $\omega_{k,i,delta}$. The compression ratio on the pre-filtering matrix may thus be $$\frac{1}{N} + \frac{2.89}{16} * \frac{N-1}{N}.$$

BBU 510 may implement further compression on each pre-filtering vector $\omega_{k,i}$ by utilizing a linear interpolation compression scheme. In the linear interpolation compression scheme, BBU 510 may transmit one pre-filtering element of each pre-filtering vector $\omega_{k,i}$ every N subcarriers. The resulting compressed pre-filtering vector $\omega_{k,i,interp}$ may thus be given as follows:

$$\omega_{k,i,interp} = [\omega_{1,k,i}, \omega_{N+1,k,i}, \ldots, \omega_{jN+1,k,i}, \ldots]^T \quad (16)$$

BBU 510 may then transmit to $\omega_{k,i,interp}$ to RRU 506 over RRU-BBU interconnection link 508. RRU 506 may then recover pre-filtering vector $\hat{\omega}_{k,i}$ as follows:

$$\hat{\omega}_{k,i} = [\hat{\omega}_{1,k,i}, \hat{\omega}_{2,k,i}, \ldots, \omega_{N_{SC},k,i}]^T \quad (17),$$

where $$\hat{\omega}_{jN+n,k,i} = \hat{\omega}_{jN+n-1,k,i} + \frac{(\hat{\omega}_{(j+1)N,k,i} - \hat{\omega}_{jN,k,i})}{N}.$$

BBU 510 may obtain a compression ratio of $$\frac{1}{N}$$

for pie-filtering vectors $\omega_{k,i}$, $k = \{1, \ldots, K\}$ and $i = \{1, \ldots, N_{RX}\}$ by applying the linear interpolation compression scheme.

Accordingly, there exist a number of options for applying data compression in order to reduce link burden in base stations, in particular by implementing compression at an RRU component to compress data transmitted to a BBU component over an RRU-BBU interconnection link. The data compression schemes may offer varying tradeoffs between performance (i.e. loss) and compression rate, and may be implemented in a variety of different base station architectures, in particular the first configuration and second configuration detailed herein.

As detailed above, in an aspect of the disclosure base station 300 and 500 may be characterized as a base station apparatus including a plurality of receive antennas (antenna array 302 or 502), baseband processing circuitry (BBU 310 or 510), radio processing circuitry (RRU 306 or 506), and a data link (RRU-BBU interconnection link 308 or 508) between the radio processing circuitry and the baseband processing circuitry. The radio processing circuitry may be configured to receive a plurality of aggregated data symbols from the plurality of receive antennas, each of the aggregated data symbols composed of transmitted data symbols from a plurality of transmit terminals and corresponding to an antenna of the plurality of antennas, apply a compression filter to the plurality of aggregated data symbols in order to reduce the plurality of aggregated data symbols into a plurality of isolated data symbols, the compression filter being based on channel estimates between the plurality of receive antennas and the plurality of transmit terminals, and transmit the plurality of isolated data symbols to the baseband processing circuitry over the data link.

As detailed above, RRU 306 or 506 may be characterized as an for processing radio signals in a base station. The apparatus may include a pre-processing circuit (AGC, ADC, & FFT hardware 306a or 506a and/or RB selection hardware 306b or 506b) configured to obtain a plurality of aggregated data symbols, each of the aggregated data symbols corresponding to a receive terminal of a plurality of receive terminals of the base station and composed of transmitted data symbols from a plurality of transmit terminals; and a compression processing circuit (CE & compression hardware 306c or compression hardware 506c) configured to apply a compression filter to the plurality of aggregated data symbols in order to reduce the plurality of aggregated data symbols into a plurality of isolated data symbols, the compression filter being based on channel estimates between the plurality of receive terminals and the plurality of transmit terminals, and transmit the plurality of isolated data symbols to a baseband processing apparatus of the base station.

Figure 6:
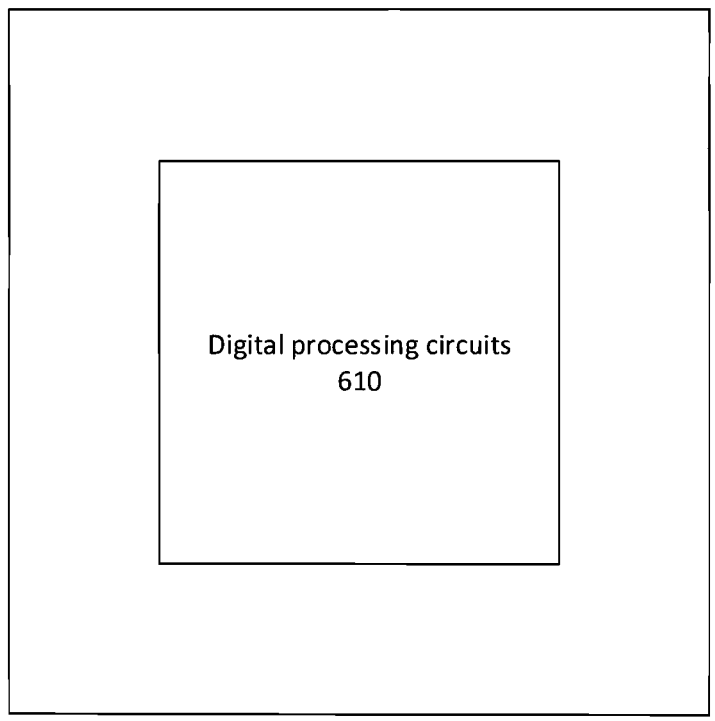
FIG. 6 shows an internal architecture of a baseband processing apparatus according to an exemplary aspect of the disclosure.

As detailed above, BBU 310 and 510 may be characterized as an apparatus for processing baseband signals in a base station. FIG. 6 shows an exemplary internal architecture of baseband processing apparatus 600, which be a BBU corresponding to either BBU 310 and/or BBU 510. As previously indicated, BBU 310 and BBU 510 may include digital processing circuitry configured to perform various signal processing operations. Similarly, baseband processing apparatus 600 may have one or more digital processing circuits 610. Baseband processing apparatus 600 may be configured to calculate a plurality of channel response estimates based on a plurality of reference symbols associated with a plurality of transmit terminals, each of the plurality of channel response estimates approximating the wireless channel between a respective transmit terminal of the plurality of transmit terminals and a respective receive terminal of a plurality of receive terminals of the base station, calculate a compression filter based on the plurality of channel response estimates, transmit the compression filter to a radio processing apparatus of the base station, receive a plurality of received data symbols from the radio processing apparatus, and perform symbol detection of the plurality of received data symbols using the compression filter to generate a plurality of detected data symbols.

Figure 7:
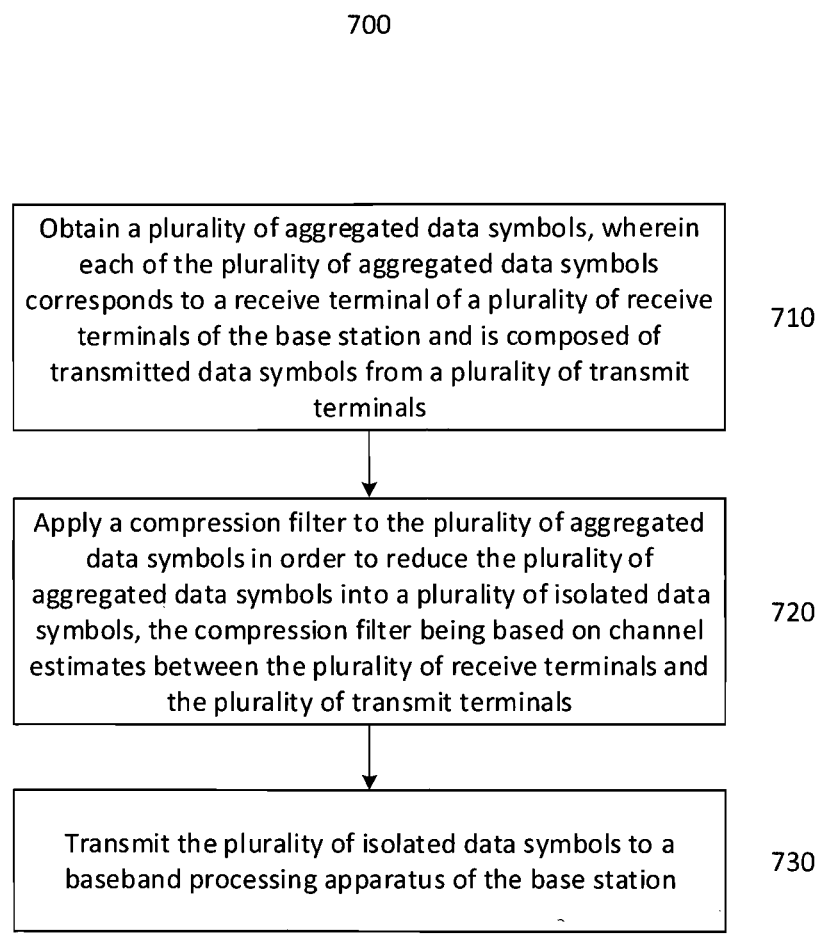
FIG. 7 shows a method of processing signals at a radio processing apparatus of a base station.

FIG. 7 shows a flow chart illustrating method 700 of processing signals in a radio processing apparatus of a base station. In 710, method 700 may obtain a plurality of aggregated data symbols, each of the aggregated data symbols corresponding to a receive terminal of a plurality of receive terminals of the base station and being composed of transmitted data symbols from a plurality of transmit terminals. Method 700 may then in 720 apply a compression filter to the plurality of aggregated data symbols in order to reduce the plurality of aggregated data symbols into a plurality of isolated data symbols, the compression filter being based on channel estimates between the plurality of receive terminals and the plurality of transmit terminals. In 730, method 700 may transmit the plurality of isolated data symbols to a baseband processing apparatus of the base station.

The further features described above in reference to FIGS. 1-5, are considered equally applicable with respect to method 700.

Figure 8:
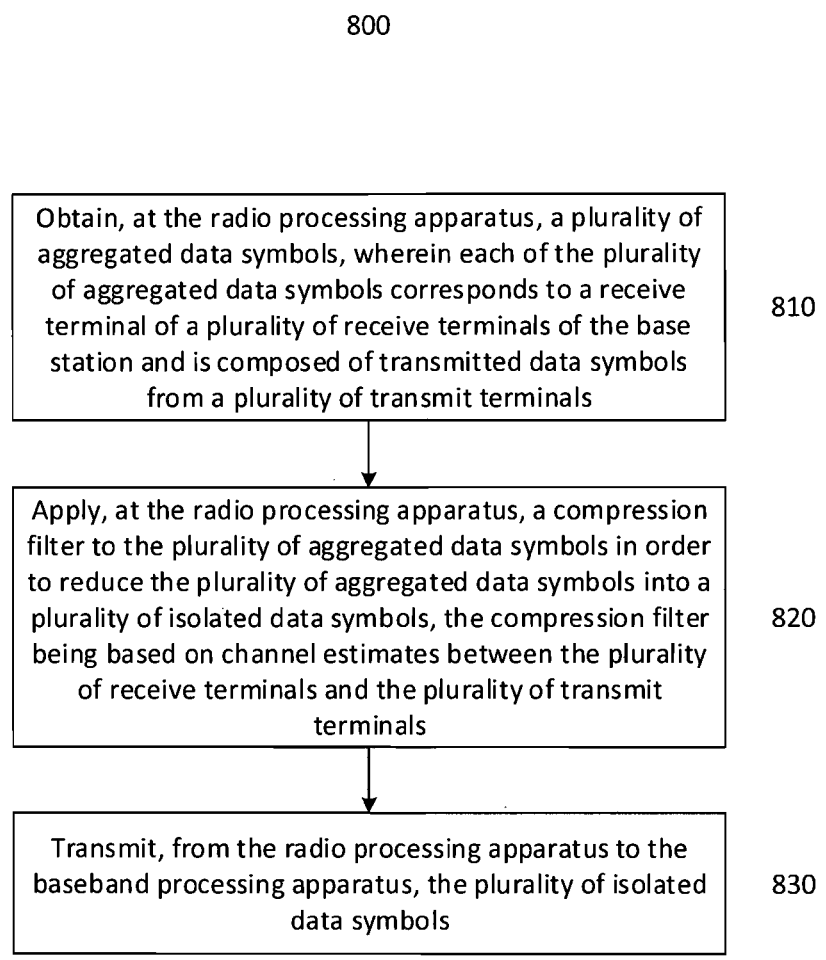
FIG. 8 shows a method of transmitting data between a radio processing apparatus and a baseband processing apparatus of a base station.

FIG. 8 shows a flow chart illustrating method 800 of transmitting data between a radio processing apparatus and a baseband processing apparatus of a base station. Method 800 may include obtaining, at the radio processing apparatus a plurality of aggregated data symbols, each of the aggregated data symbols corresponding to a receive terminal of a plurality of receive terminals of the base station and being composed of transmitted data symbols from a plurality of transmit terminals in 810. Method 800 may then in 820 apply, at the radio processing apparatus, a compression filter to the plurality of aggregated data symbols in order to reduce the plurality of aggregated data symbols into a plurality of isolated data symbols, the compression filter being based on channel estimates between the plurality of receive terminals and the plurality of transmit terminals. In 830 method 800 may transmit, from the radio processing apparatus to the baseband processing apparatus, the plurality of isolated data symbols.

The further features described above in reference to FIGS. 1-5, are considered equally applicable with respect to method 800.

Figure 9:
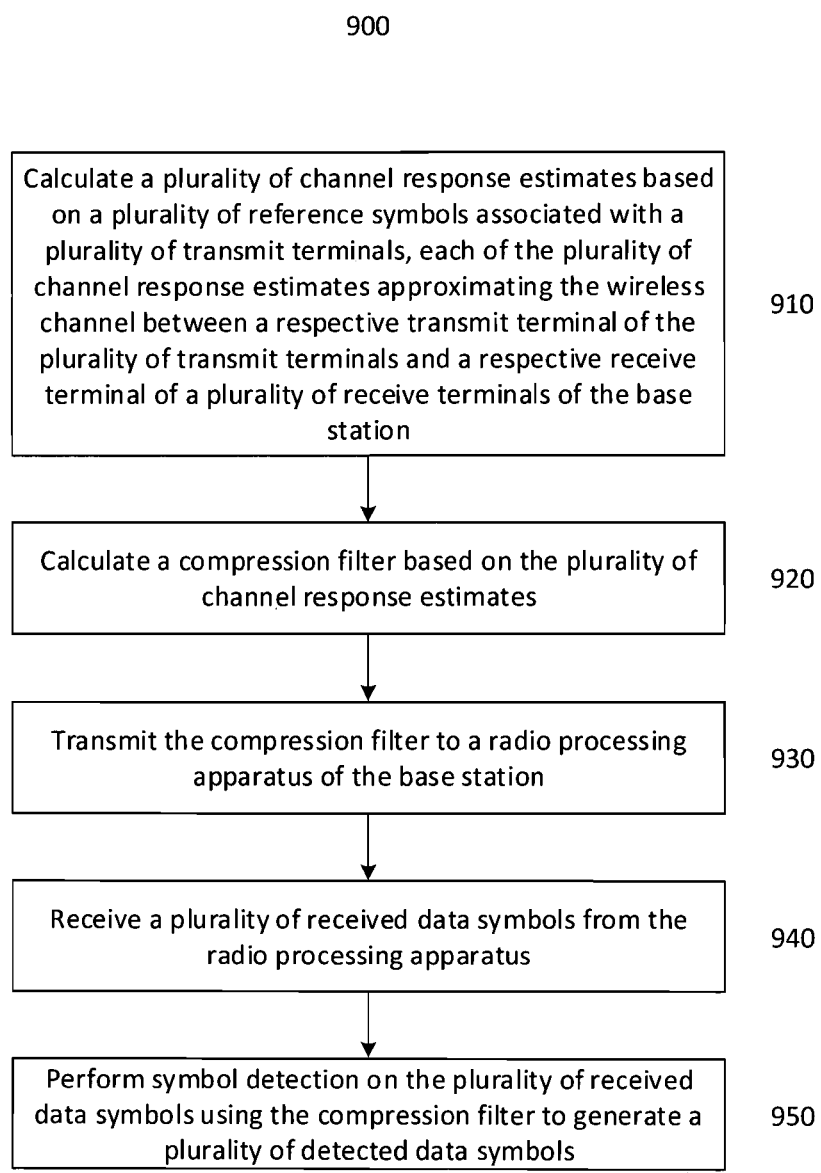
FIG. 9 shows a method of processing signals at a baseband processing apparatus configured to be implemented in a base station.

FIG. 9 shows a flow chart illustrating method 900 of processing signals in a baseband processing apparatus configured to be implemented in a base station. In 910, method 900 may calculate a plurality of channel response estimates based on a plurality of reference symbols associated with a plurality of transmit terminals, each of the plurality of channel response estimates approximating the wireless channel between a respective transmit terminal of the plurality of transmit terminals and a respective receive terminal of a plurality of receive terminals of the base station. Method 900 may then calculate a compression filter based on the plurality of channel response estimates in 920. In 930, method 900 may transmit the compression filter to a radio processing apparatus of the base station. In 940, method 900 may receive a plurality of received data symbols from the radio processing apparatus. In 950, method 900 may perform symbol detection on the plurality of received data symbols using the compression filter to generate a plurality of detected data symbols.

The further features described above in reference to FIGS. 1-2 and 4-5 are considered equally applicable with respect to method 900.

It is appreciated that many of the compression schemes may be readily combined and/or aggregated for application in a single base station structure. While all such combinations may not necessarily be explicitly detailed herein, it is understood that all such potential combinations are embraced by the scope of this disclosure.

As previously detailed, such compression schemes may be particularly advantageous in realizing thin base station architectures for massive uplink MIMO schemes, such as for LTE network configurations. However it is appreciated that the implementations detailed herein are considered demonstrative in nature, and may thus be readily applied in any number of scenarios, such as involving alternative communication protocols to LTE and/or conventional MIMO schemes.

Furthermore, while the compression filters detailed herein have exhibited a focus on derivation from channel estimates based on DMRS and/or SRS, it is appreciated that any such channel estimation procedure may be applicable, and is thus not limited to the use of DMRS and/or SRS. For example, it is understood that any such MIMO channel estimation procedure related to symbol recovery may be similarly applied in the derivation of compression filters for compressing data at a remote unit.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following examples pertain to further aspects of the disclosure:

Example 1 is a method of processing signals in a radio processing apparatus of a base station. The method includes obtaining a plurality of aggregated data symbols, wherein each of the plurality of aggregated data symbols corresponds to a receive terminal of a plurality of receive terminals of the base station and is composed of transmitted data symbols from a plurality of transmit terminals, applying a compression filter to the plurality of aggregated data symbols in order to reduce the plurality of aggregated data symbols into a plurality of isolated data symbols, the compression filter being based on channel estimates between the plurality of receive terminals and the plurality of transmit terminals, and transmitting the plurality of isolated data symbols to a baseband processing apparatus of the base station.

In Example 2, the subject matter of Example 1 can optionally include receiving the compression filter at the radio processing apparatus from the baseband processing apparatus.

In Example 3, the subject matter of Example 2 can optionally include wherein the receiving the compression filter at the radio processing apparatus from the baseband processing apparatus includes receiving the compression filter in a compressed form at the radio processing apparatus.

In Example 4, the subject matter of Example 2 can optionally include receiving a plurality of reference symbols corresponding to the plurality of receive terminals, and transmitting the plurality of reference symbols to the baseband processing apparatus.

In Example 5, the subject matter of Example 4 can optionally include applying the compression filter to the plurality of reference symbols to generate a plurality of compressed reference symbols, and wherein the transmitting the plurality of reference symbols to the baseband processing apparatus includes transmitting the plurality of compressed reference symbols to the baseband processing apparatus.

In Example 6, the subject matter of Example 6 can optionally include wherein the plurality of reference symbols are demodulation reference symbols (DMRS).

In Example 7, the subject matter of Example 1 can optionally include determining the compression filter at the radio processing apparatus based on wireless channel estimates between the plurality of receive terminals of the base station and one or more of the plurality of transmit terminals.

In Example 8, the subject matter of Example 1 can optionally include calculating the compression filter at the radio processing apparatus.

In Example 9, the subject matter of Example 8 can optionally include calculating the compression filter at the radio processing apparatus by calculating a plurality of channel response estimates based on a plurality of reference symbols corresponding to the plurality of transmit terminals, each of the plurality of channel response estimates approximating the wireless channel between a respective transmit terminal of the plurality of transmit terminals and a respective receive terminal of the plurality of receive terminals, and calculating the compression filter based on the plurality of channel response estimates.

In Example 10, the subject matter of Example 9 can optionally include wherein the plurality of reference symbols includes demodulation reference symbols (DMRS).

In Example 11, the subject matter of Example 9 can optionally include receiving the plurality of reference symbols from the plurality of transmit terminals.

In Example 12, the subject matter of Example 11 can optionally include wherein the receiving the plurality of reference symbols from the plurality of transmit terminals includes receiving the plurality of reference symbols from the plurality of transmit terminals using shared time-frequency resources.

In Example 13, the subject matter of Example 12 can optionally include wherein the plurality of transmit terminals are part of a multiple input multiple output (MIMO) scheme.

In Example 14, the subject matter of Example 8 can optionally include compressing the compression filter at the radio processing apparatus to generate a compressed compression filter, and transmitting the compressed compression filter to the baseband processing apparatus.

In Example 15, the subject matter of Example 8 can optionally include wherein the calculating the compression filter includes calculating channel response estimates between the plurality of receive terminals and the plurality of transmit terminals based on a plurality of reference symbols received from the plurality of transmit terminals.

In Example 16, the subject matter of any one of Examples 1 to 15 can optionally include wherein the compression filter includes a plurality of filter values, and wherein the applying a compression filter to the plurality of aggregated data symbols includes multiplying the plurality of aggregated symbols with the plurality of filter values to obtain the plurality of isolated data symbols.

In Example 17, the subject matter of any one of Examples 1 to 15 can optionally include wherein the compression filter includes a filter matrix, and wherein the applying a compression filter to the plurality of aggregated data symbols includes performing matrix multiplication between the filter matrix and a vector composed of the plurality of aggregated data symbols to obtain the plurality of isolated data symbols.

In Example 18, the subject matter of any one of Examples 1 to 15 can optionally include wherein the number of aggregated data symbols of the plurality of data symbols is greater than the number of isolated data symbols of the plurality of isolated data symbols.

In Example 19, the subject matter of Example 18 can optionally include wherein the number of aggregated data symbols of the plurality of data symbols is correlated with the number of receive terminals of the plurality of receive terminals, and wherein the number of isolated data symbols of the plurality of isolated data symbols is correlated with the number of transmit terminals of the plurality of transmit terminals.

In Example 20, the subject matter of any one of Examples 1 to 15 can optionally include wherein the total amount of data associated with the plurality of isolated data symbols is less than the total amount of data associated with the aggregated data symbols.

In Example 21, the subject matter of any one of Examples 1 to 15 can optionally include wherein the plurality of transmit terminals are mobile terminal devices.

In Example 22, the subject matter of any one of Examples 1 to 15 can optionally include wherein the plurality of receive terminals are receive antennas of the base station.

In Example 23, the subject matter of any one of Examples 1 to 15 can optionally include wherein the plurality of transmit terminals are mobile terminal devices and the plurality of receive terminals are receive antennas of the base station.

In Example 24, the subject matter of Example 23 can optionally include wherein the plurality of transmit terminals and the plurality of receive terminals are part of a multiple input multiple output (MIMO) scheme.

In Example 25, the subject matter of Example 1 can optionally include compressing the compression filter to generate a compressed compression filter at the radio processing apparatus, and transmitting the compressed compression filter to the baseband processing apparatus.

In Example 26, the subject matter of Example 25 can optionally include wherein the compression filter includes a plurality of elements, and wherein the compressing the compression filter to generate a compressed compression filter at the radio processing apparatus includes selecting one or more repeated elements of the compression filter, and generating the compressed compression filter using the one or more repeated elements.

In Example 27, the subject matter of Example 25 can optionally include wherein the compressing the compression filter to generate a compressed compression filter at the radio processing apparatus includes generating the compressed compression filter by applying a discrete cosine transform to the compression filter.

In Example 28, the subject matter of any one of Examples 1 to 15 can optionally include wherein the radio processing apparatus is a remote radio unit (RRU) and the baseband processing apparatus is a baseband unit (BBU).

In Example 29, the subject matter of any one of Examples 1 to 15 can optionally include wherein the radio processing apparatus and the baseband processing apparatus are connected by an interconnection data link, and wherein the transmitting the plurality of isolated data symbols to the baseband processing apparatus includes transmitting the plurality of isolated data symbols over the interconnection data link.

In Example 30, the subject matter of Example 29 can optionally include wherein the interconnection data link includes an optical fiber link.

Example 31 is a method of transmitting data between a radio processing apparatus and a baseband processing apparatus of a base station. The method includes obtaining, at the radio processing apparatus a plurality of aggregated data symbols, wherein each of the plurality of aggregated data symbols corresponds to a receive terminal of a plurality of receive terminals of the base station and is composed of transmitted data symbols from a plurality of transmit terminals, applying, at the radio processing apparatus, a compression filter to the plurality of aggregated data symbols in order to reduce the plurality of aggregated data symbols into a plurality of isolated data symbols, the compression filter being based on channel estimates between the plurality of receive terminals and the plurality of transmit terminals, and transmitting, from the radio processing apparatus to the baseband processing apparatus, the plurality of isolated data symbols.

In Example 32, the subject matter of Example 31 can optionally include performing, at the baseband processing apparatus, symbol detection on the plurality of isolated data symbols in order to generate a plurality of detected data symbols.

In Example 33, the subject matter of Example 32 can optionally include wherein the plurality of detected data symbols approximate the transmitted data symbols from the plurality of transmit terminals.

In Example 34, the subject matter of Example 31 can optionally include calculating, at the radio processing apparatus, the compression filter.

In Example 35, the subject matter of Example 34 can optionally include calculating, at the radio processing apparatus, the compression filter by calculating a plurality of channel response estimates based on a plurality of reference symbols corresponding to the plurality of transmit terminals, each of the plurality of channel response estimates approximating the wireless channel between a respective transmit terminal of the plurality of transmit terminals and a respective receive terminal of the plurality of receive terminals, and calculating the compression filter based on the plurality of channel response estimates.

In Example 36, the subject matter of Example 35 can optionally include wherein the plurality of transmit terminals and the plurality of receive terminals are part of a multiple input multiple output (MIMO) scheme.

In Example 37, the subject matter of Example 31 can optionally include wherein the compression filter includes a plurality of filter values, and wherein the applying a compression filter to the plurality of aggregated data symbols includes multiplying, at the radio processing apparatus, the plurality of aggregated data symbols with the plurality of filter values to obtain the plurality of isolated data symbols.

In Example 38, the subject matter of Example 31 can optionally include wherein the compression filter includes a filter matrix, and wherein the applying a compression filter to the plurality of aggregated data symbols includes performing, at the radio processing apparatus, matrix multiplication between the filter matrix and a vector composed of the plurality of aggregated data symbols to obtain the plurality of isolated data symbols.

In Example 39, the subject matter of Example 34 can optionally include transmitting, from the radio processing apparatus to the baseband processing apparatus, the compression filter.

In Example 40, the subject matter of Example 39 can optionally include performing, at the baseband processing apparatus, symbol detection on the plurality of isolated data symbols in order to generate a plurality of detected data symbols by applying the compression filter to the plurality of isolated data symbols in order to generate the plurality of detected data symbols.

In Example 41, the subject matter of Example 40 can optionally include wherein the applying the compression filter to the plurality of isolated data symbols in order to generate the plurality of detected data symbols includes applying the compression filter as part of minimum mean squares (MMSE) estimation to generate the plurality of detected data symbols.

In Example 42, the subject matter of Example 39 can optionally include wherein the transmitting the compression filter includes compressing the compression filter at the radio processing apparatus to generate a compressed compression filter, and transmitting the compressed compression filter from the radio processing apparatus to the baseband processing apparatus over the data link.

In Example 43, the subject matter of Example 42 can optionally include wherein the compression filter includes a plurality of elements, and wherein the compressing the compression filter to generate a compressed compression filter, includes identifying a plurality of redundant elements of the compression filter, and generating the compressed compression filter as the plurality of redundant elements.

In Example 44, the subject matter of Example 42 can optionally include wherein the compressing the compression filter to generate a compressed compression filter include applying a discrete cosine transform to the compression filter to generate the compressed compression filter.

In Example 45, the subject matter of Example 31 can optionally include calculating, at the baseband processing apparatus, the compression filter, and transmitting, from the baseband processing apparatus to the radio processing apparatus, the compression filter.

In Example 46, the subject matter of Example 31 can optionally include calculating, at the baseband processing apparatus, an uncompressed compression filter, compressing, at the baseband processing apparatus, the uncompressed compression filter to generate the compression filter, and transmitting, from the baseband processing apparatus to the radio processing apparatus, the compression filter.

In Example 47, the subject matter of Example 46 can optionally include wherein the compressing the uncompressed compression filter to generate the compression filter includes compressing the uncompressed compression filter using a delta or linear interpolation compression scheme to generate the compression filter.

In Example 48, the subject matter of Example 45 can optionally include wherein the calculating the compression filter includes calculating the compression filter based on a plurality of reference symbols corresponding to the plurality of transmit terminals.

In Example 49, the subject matter of Example 48 can optionally include wherein the calculating the compression filter based on a plurality of reference symbols corresponding to the plurality of transmit terminals includes calculating a plurality of channel response estimates based on the plurality of reference symbols, each of the plurality of channel response estimates approximating the wireless channel between a respective transmit terminal of the plurality of transmit terminals and a respective receive terminal of the plurality of receive terminals.

In Example 50, the subject matter of Example 48 can optionally include receiving, at the radio processing apparatus, the plurality of reference symbols from the plurality of receive antennas, each of the plurality of reference symbols corresponding to a respective transmit terminal of the plurality of transmit terminals, and transmitting, from the radio processing apparatus to the baseband processing apparatus, the plurality of reference symbols over the data link.

In Example 51, the subject matter of Example 50 can optionally include wherein the plurality of reference symbols are sounding reference symbols (SRSs).

In Example 52, the subject matter of Example 45 can optionally include receiving, at the radio processing apparatus, a plurality of reference symbols corresponding to the plurality of aggregated data symbols, and transmitting, from the radio processing apparatus to the baseband processing apparatus, the plurality of reference symbols over the data link.

In Example 53, the subject matter of Example 52 can optionally include wherein the plurality of reference symbols are demodulation reference symbols (DMRSs).

In Example 54, the subject matter of Example 52 can optionally include applying, at the radio processing apparatus, the compression filter to the plurality of reference symbols to generate a plurality of compressed reference symbols, and wherein the transmitting the plurality of reference symbols includes transmitting, from the radio processing apparatus to the baseband processing apparatus, the plurality of compressed reference symbols.

In Example 55, the subject matter of Example 52 can optionally include applying, at the baseband processing apparatus, the compression filter and the plurality of reference symbols in order to perform symbol detection on the plurality of isolated data symbols to generate a plurality of detected data symbols.

In Example 56, the subject matter of Example 55 can optionally include wherein the plurality of detected data symbols approximate the plurality of transmitted data symbols.

In Example 57, the subject matter of Example 55 can optionally include wherein the applying the compression filter and the plurality of reference symbols in order to perform symbol detection on the plurality of isolated data symbols to generate a plurality of detected data symbols includes performing symbol detection on the plurality of isolated data symbols using minimum mean squares estimation (MMSE) based on the compression filter and the plurality of reference symbols.

In Example 58, the subject matter of Example 57 can optionally include calculating, at the baseband processing apparatus, a plurality of channel response estimates based on the plurality of reference symbols, each of the plurality of channel response estimates approximating the wireless channel between a respective transmit terminal of the plurality of transmit terminals and a respective receive terminal of the plurality of receive terminals, and wherein the performing symbol detection on the plurality of isolated data symbols includes performing symbol detection on the plurality of isolated data symbols using minimum mean squares estimation (MMSE) based on the compression filter and the plurality of channel response estimates.

In Example 59, the subject matter of Example 45 can optionally include updating, at the baseband processing apparatus, the compression filter, and transmitting the updated compression filter to the radio processing apparatus over the data link.

In Example 60, the subject matter of Example 59 can optionally include wherein the baseband processing apparatus is further configured to receive a plurality of first reference symbols and a plurality of second reference symbols from the radio processing apparatus, and wherein the baseband processing apparatus is configured to update the compression filter based on the plurality of first reference symbols and the plurality of second reference symbols.

In Example 61, the subject matter of Example 60 can optionally include wherein the radio processing apparatus is configured to receive the plurality of first reference symbols and the plurality of second reference symbols, and transmit the plurality of first reference symbols and the plurality of second reference symbols to the baseband processing apparatus over the data link.

In Example 62, the subject matter of Example 60 can optionally include wherein the plurality of first reference symbols are sounding reference symbols (SRSs) and the plurality of second reference symbols are demodulation reference symbols (DMRSs).

In Example 63, the subject matter of any one of Examples 31 to 62 can optionally include wherein the baseband processing apparatus is a baseband unit (BBU) and the radio processing apparatus is a remote radio unit (RRU).

Example 64 is an apparatus for processing radio frequency signals in a base station. The radio processing apparatus includes a pre-processing circuit configured to obtain a plurality of aggregated data symbols, wherein each of the plurality of aggregated data symbols corresponds to a receive terminal of a plurality of receive terminals of the base station and is composed of transmitted data symbols from a plurality of transmit terminals, and a compression processing circuit configured to apply a compression filter to the plurality of aggregated data symbols in order to reduce the plurality of aggregated data symbols into a plurality of isolated data symbols, the compression filter being based on channel estimates between the plurality of receive terminals and the plurality of transmit terminals, and transmit the plurality of isolated data symbols to a baseband processing apparatus of the base station.

In Example 65, the subject matter of Example 64 can optionally include wherein the compression processing circuit is configured to receive the compression filter from the baseband processing apparatus.

In Example 66, the subject matter of Example 65 can optionally include wherein the compression processing circuit is further configured to receive the compression filter from the baseband processing apparatus in a compressed form.

In Example 67, the subject matter of Example 65 can optionally include wherein the compression processing circuit is further configured to receive a plurality of reference symbols corresponding to the plurality of receive terminals, and transmit the plurality of reference symbols to the baseband processing apparatus.

In Example 68, the subject matter of Example 65 can optionally include wherein the processing compression circuit is further configured to apply the compression filter to the plurality of reference symbols to generate a plurality of compressed reference symbols, and wherein the compression processing circuit is configured to transmit the plurality of reference symbols to the baseband processing apparatus by transmitting the plurality of compressed reference symbols to the baseband processing apparatus.

In Example 69, the subject matter of Example 68 can optionally include wherein the plurality of reference symbols are demodulation reference symbols (DMRS).

In Example 70, the subject matter of Example 64 can optionally include wherein the compression processing circuit is further configured to determine the compression filter based on wireless channel estimates between the plurality of receive terminals of the base station and one or more of the plurality of transmit terminals.

In Example 71, the subject matter of Example 64 can optionally include wherein the compression processing circuit is further configured to calculate the wireless channel estimates based on reference signals received from the plurality of transmit terminals.

In Example 72, the subject matter of Example 64 can optionally include wherein the compression processing circuit is configured to calculate the compression filter.

In Example 73, the subject matter of Example 72 can optionally include wherein the compression processing circuit is configured to calculate the compression filter by calculating a plurality of channel response estimates based on a plurality of reference symbols corresponding to the plurality of transmit terminals, each of the plurality of channel response estimates approximating the wireless channel between a respective transmit terminal of the plurality of transmit terminals and a respective receive terminal of the plurality of receive terminals, and calculating the compression filter based on the plurality of channel response estimates.

In Example 74, the subject matter of Example 73 can optionally include wherein the plurality of reference symbols include demodulation reference symbols (DMRS).

In Example 75, the subject matter of Example 73 can optionally include wherein the pre-processing circuit is configured to receive the plurality of reference symbols from the plurality of transmit terminals and provide the plurality of reference symbols to the compression processing circuit.

In Example 76, the subject matter of Example 75 can optionally include wherein the pre-processing circuit is configured to receive the plurality of reference symbols from the plurality of transmit terminals using shared time-frequency resources.

In Example 77, the subject matter of Example 76 can optionally include wherein the plurality of transmit terminals are part of a multiple input multiple output (MIMO) scheme.

In Example 78, the subject matter of Example 73 can optionally include wherein the compression processing circuit is configured to compress the compression filter to generate a compressed compression filter and transmit the compressed compression filter to the baseband processing apparatus.

In Example 79, the subject matter of Example 72 can optionally include wherein the compression processing circuit is configured to calculate the compression filter by calculating channel response estimates between the plurality of receive terminals based on a plurality of reference symbols corresponding to the plurality of transmit terminals.

In Example 80, the subject matter of Example 73 can optionally include wherein the compression filter includes a plurality of filter values, and wherein the compression processing circuit is configured to apply a compression filter to the plurality of aggregated data symbols by multiplying the plurality of aggregated data symbols with the plurality of filter values to obtain the plurality of isolated data symbols.

In Example 81, the subject matter of Example 72 can optionally include wherein the compression filter includes a filter matrix, and wherein the compression processing circuit is configured to apply the compression filter to the plurality of aggregated data symbols by performing matrix multiplication between the filter matrix and a vector composed of the plurality of aggregated data symbols to obtain the plurality of isolated data symbols.

In Example 82, the subject matter of any one of Examples 64 to 81 can optionally include wherein the number of aggregated data symbols of the plurality of data symbols is greater than the number of isolated data symbols of the plurality of isolated data symbols.

In Example 83, the subject matter of Example 82 can optionally include wherein the number of aggregated data symbols of the plurality of data symbols is correlated with the number of receive terminals of the plurality of receive terminals, and wherein the number of isolated data symbols of the plurality of isolated data symbols is correlated with the number of transmit terminals of the plurality of transmit terminals.

In Example 84, the subject matter of any one of Examples 64 to 81 can optionally include wherein the total amount of data associated with the plurality of isolated data symbols is less than the total amount of data associated with the aggregated data symbols.

In Example 85, the subject matter of any one of Examples 64 to 81 can optionally include wherein the plurality of transmit terminals are mobile terminal devices.

In Example 86, the subject matter of any one of Examples 64 to 81 can optionally include wherein the plurality of transmit terminals are mobile terminal devices involved in an uplink multiple input multiple output (MIMO) scheme.

In Example 87, the subject matter of any one of Examples 64 to 81 can optionally include wherein the plurality of receive terminals are receive antennas of the base station.

In Example 88, the subject matter of any one of Examples 64 to 81 can optionally include wherein the plurality of transmit terminals are mobile terminal devices and the plurality of receive terminals are receive antennas of the base station.

In Example 89, the subject matter of any one of Examples 64 to 81 can optionally include wherein the plurality of transmit terminals and the plurality of receive terminals are part of a multiple input multiple output (MIMO) scheme.

In Example 90, the subject matter of any one of Examples 64 to 81 can optionally include wherein the apparatus is a remote radio unit (RRU) and the baseband processing apparatus is a baseband unit (BBU).

In Example 91, the subject matter of any one of Examples 64 to 81 can optionally include wherein the apparatus and the baseband processing apparatus are connected by an interconnection data link, and wherein the transmitting the plurality of isolated data symbols to the baseband processing apparatus includes transmitting the plurality of isolated data symbols over the interconnection data link.

In Example 92, the subject matter of Example 91 can optionally include wherein the interconnection data link includes an optical fiber link.

In Example 93, the subject matter of Example 64 can optionally include wherein the compression processing circuit is configured to compress the compression filter to generate a compressed compression filter, and transmit the compressed compression filter to the baseband processing apparatus.

In Example 94, the subject matter of Example 93 can optionally include wherein the compression filter includes a plurality of elements, and wherein the compression processing circuit is configured to generate the compressed compression filter by selecting one or more repeated elements of the compression filter, and generating the compressed compression filter using the one or more repeated elements.

In Example 95, the subject matter of Example 93 can optionally include wherein the compression processing circuit is configured to compress the compression filter to generate a compressed compression filter at the apparatus by generating the compressed compression filter by applying a discrete cosine transform the compression filter.

Example 96 is a base station. The base station includes a plurality of receive antennas, baseband processing circuitry, radio processing circuitry, and a data link between the radio processing circuitry and the baseband processing circuitry, the radio processing circuitry configured to receive a plurality of aggregated data symbols from the plurality of receive antennas, wherein each of the plurality of aggregated data symbols is composed of transmitted data symbols from a plurality of transmit terminals and corresponds to an antenna of the plurality of antennas, apply a compression filter to the plurality of aggregated data symbols in order to reduce the plurality of aggregated data symbols into a plurality of isolated data symbols, the compression filter being based on channel estimates between the plurality of receive antennas and the plurality of transmit terminals, and transmit the plurality of isolated data symbols to the baseband processing circuitry over the data link.

In Example 97, the subject matter of Example 96 can optionally include wherein the baseband processing circuitry is configured to perform symbol detection on the plurality of isolated data symbols in order to generate plurality of detected data symbols.

In Example 98, the subject matter of Example 97 can optionally include wherein the plurality of detected data symbols approximate the transmitted data symbols from the plurality of transmit terminals.

In Example 99, the subject matter of Example 96 can optionally include wherein the radio processing circuitry is configured to calculate the compression filter.

In Example 100, the subject matter of Example 96 can optionally include wherein the radio processing circuitry is configured to calculate the compression filter by calculating a plurality of channel response estimates based on a plurality of reference symbols corresponding to the plurality of transmit terminals, each of the plurality of channel response estimates approximating the wireless channel between a respective transmit terminal of the plurality of transmit terminals and a respective receive terminal of the plurality of receive terminals, and calculating the compression filter based on the plurality of channel response estimates.

In Example 101, the subject matter of Example 100 can optionally include wherein the plurality of transmit terminals and the plurality of receive terminals are part of a multiple input multiple output (MIMO) scheme.

In Example 102, the subject matter of Example 96 can optionally include wherein the compression filter includes a plurality of filter values, and wherein the radio processing circuitry is configured to apply the compression filter to the plurality of aggregated data symbols by multiplying the plurality of aggregated data symbols with the plurality of filter values to obtain the plurality of isolated data symbols.

In Example 103, the subject matter of Example 96 can optionally include wherein the compression filter includes a filter matrix, and wherein the radio processing circuitry is configured to apply a compression filter to the plurality of aggregated data symbols by performing matrix multiplication between the filter matrix and a vector composed of the plurality of aggregated data symbols to obtain the plurality of isolated data symbols.

In Example 104, the subject matter of Example 96 can optionally include wherein the radio processing circuitry is further configured to transmit the compression filter to the baseband processing circuitry over the data link.

In Example 105, the subject matter of Example 104 can optionally include wherein the baseband processing circuitry is configured to receive the compression filter and the plurality of isolated data symbols over the data link.

In Example 106, the subject matter of Example 104 can optionally include wherein the baseband processing circuitry is configured to receive the compression filter and the plurality of isolated data symbols over the data link, and perform symbol detection on the plurality of isolated data symbols using the compression filter to generate a plurality of detected data symbols, the detected data symbols approximating the plurality of transmitted data symbols.

In Example 107, the subject matter of Example 106 can optionally include wherein the baseband processing circuitry is configured to perform symbol detection on the plurality of isolated data symbols using the compression filter to generate the plurality of detected data symbols using minimum mean squares estimation (MMSE).

In Example 108, the subject matter of Example 104 can optionally include wherein the radio processing circuitry is configured to transmit the compression filter to the baseband processing circuitry over the data link by compressing the compression filter to generate a compressed compression filter, and transmitting the compressed compression filter to the baseband processing circuitry over the data link.

In Example 109, the subject matter of Example 108 can optionally include wherein the radio processing circuitry is configured to compress the compression filter to generate a compressed compression filter by applying a discrete cosine transform to the compression filter to generate the compressed compression filter.

In Example 110, the subject matter of Example 96 can optionally include wherein the compression filter includes a plurality of filter elements, and wherein the radio processing circuitry is configured to transmit the compression filter to the baseband processing circuitry over the data link by identifying a plurality of redundant filter elements of the compression filter, generating a compressed compression filter as the plurality of redundant filter elements of the compression filter, and transmitting the compressed compression filter to the baseband processing circuitry over the data link.

In Example 111, the subject matter of Example 110 can optionally include wherein the compression filter includes a filter matrix composed of the plurality of filter elements, and wherein the identifying a plurality of redundant filter elements includes identifying the filter elements forming an upper or lower triangle of the filter matrix as the plurality of redundant filter elements.

In Example 112, the subject matter of Example 96 can optionally include wherein the baseband processing circuitry is configured to calculate the compression filter, and transmit the compression filter to the radio processing circuitry over the data link.

In Example 113, the subject matter of Example 96 can optionally include wherein the baseband processing circuitry is configured to calculate an uncompressed compression filter, compress the uncompressed compression filter to generate the compression filter, and transmit the compression filter to the radio processing circuitry over the data link.

In Example 114, the subject matter of Example 113 can optionally include wherein the baseband processing circuitry is configured to compress the uncompressed compression filter to generate the compression filter by compressing the uncompressed compression filter using a delta or linear interpolation compression scheme to generate the compression filter.

In Example 115, the subject matter of Example 112 can optionally include wherein the baseband processing circuitry is configured to calculate the compression filter based on a plurality of reference symbols corresponding to the plurality of transmit terminals.

In Example 116, the subject matter of Example 115 can optionally include wherein the baseband processing circuitry is configured to calculate the compression filter by calculating a plurality of channel response estimates based on the plurality of reference symbols, each of the plurality of channel response estimates approximating the wireless channel between a respective transmit terminal of the plurality of transmit terminals and a respective receive terminal of the plurality of receive terminals.

In Example 117, the subject matter of Example 115 can optionally include wherein the radio processing circuitry is further configured to receive a plurality of reference symbols from the plurality of receive antennas, each of the plurality of reference symbols corresponding to a respective transmit terminal of the plurality of transmit terminals, and transmit the plurality of reference symbols to the baseband processing circuitry over the data link.

In Example 118, the subject matter of Example 117 can optionally include wherein the plurality of reference symbols are sounding reference symbols (SRSs).

In Example 119, the subject matter of Example 112 can optionally include wherein the radio processing circuitry is further configured to receive a plurality of reference symbols corresponding to the plurality of aggregated data symbols, and transmit the plurality of reference symbols to the baseband processing circuitry over the data link.

In Example 120, the subject matter of Example 119 can optionally include wherein the plurality of reference symbols are demodulation reference symbols (DMRSs).

In Example 121, the subject matter of Example 119 can optionally include wherein the radio processing circuitry is further configured to apply the compression filter to the plurality of reference symbols to generate a plurality of compressed reference symbols, and wherein the radio processing circuitry is configured to transmit the plurality of reference symbols to the baseband processing circuitry over the data link by transmitting the plurality of compressed reference symbols to the baseband processing circuitry.

In Example 122, the subject matter of Example 119 can optionally include wherein the baseband processing circuitry is further configured to apply the compression filter and the plurality of reference symbols in order to perform symbol detection on the plurality of isolated data symbols to generate a plurality of detected data symbols.

In Example 123, the subject matter of Example 122 can optionally include wherein the plurality of detected data symbols approximate the plurality of transmitted data symbols.

In Example 124, the subject matter of Example 122 can optionally include wherein the baseband processing circuitry is configured to apply the compression filter and the plurality of reference symbols in order to perform symbol detection on the plurality of isolated data symbols to generate a plurality of detected data symbols by performing symbol detection on the plurality of isolated data symbols using minimum mean squares estimation (MMSE) based on the compression filter and the plurality of reference symbols.

In Example 125, the subject matter of Example 124 can optionally include wherein the baseband processing circuitry is further configured to calculate a plurality of channel response estimates based on the plurality of reference symbols, each of the plurality of channel response estimates approximating the wireless channel between a respective transmit terminal of the plurality of transmit terminals and a respective receive terminal of the plurality of receive terminals, and wherein the baseband processing circuitry is configured to perform symbol detection on plurality of isolated data symbols by performing symbol detection on the plurality of isolated data symbols using minimum mean squares estimation (MMSE) based on the compression filter and the plurality of channel response estimates.

In Example 126, the subject matter of Example 112 can optionally include wherein the baseband processing circuitry is further configured to update the compression filter and transmit the updated compression filter to the radio processing circuitry over the data link.

In Example 127, the subject matter of Example 126 can optionally include wherein the baseband processing circuitry is configured to receive a plurality of first reference symbols and a plurality of second reference symbols from the radio processing circuitry, and wherein the baseband processing circuitry is configured to update the compression filter based on the plurality of first reference symbols and the plurality of second reference symbols.

In Example 128, the subject matter of Example 127 can optionally include wherein the radio processing circuitry is configured to receive the plurality of first reference symbols and the plurality of second reference symbols, and transmit the plurality of first reference symbols and the plurality of second reference symbol to the baseband processing circuitry over the data link.

In Example 129, the subject matter of Example 127 can optionally include wherein the plurality of first reference symbols are sounding reference symbols (SRSs) and the plurality of second reference symbols are demodulation reference symbols (DMRSs).

In Example 130, the subject matter of any one of Examples 96 to 129 can optionally include wherein the baseband processing circuitry is a baseband unit (BBU) of the base station and the radio processing circuitry is a remote radio unit (RRU) of the base station.

Example 131 is an apparatus for processing baseband frequency signals in a base station. The apparatus includes one or more digital processing circuits and is configured to calculate a plurality of channel response estimates based on a plurality of reference symbols associated with a plurality of transmit terminals, each of the plurality of channel response estimates approximating the wireless channel between a respective transmit terminal of the plurality of transmit terminals and a respective receive terminal of a plurality of receive terminals of the base station, calculate a compression filter based on the plurality of channel response estimates, transmit the compression filter to a radio processing apparatus of the base station, receive a plurality of received data symbols from the radio processing apparatus, and perform symbol detection of the plurality of received data symbols using the compression filter to generate a plurality of detected data symbols.

In Example 132, the subject matter of Example 131 can optionally include configured to receive the plurality of reference symbols from the radio processing apparatus.

In Example 133, the subject matter of Example 132 can optionally include further configured to receive a plurality of additional reference symbols from the radio processing apparatus.

In Example 134, the subject matter of Example 133 can optionally include further configured to receive the plurality of additional reference symbols in a compressed form.

In Example 135, the subject matter of Example 133 can optionally include wherein the plurality of additional reference symbols include demodulation reference symbols (DMRS).

In Example 136, the subject matter of Example 133 can optionally include further configured to calculate a plurality of additional channel response estimates based on the plurality of additional reference symbols.

In Example 137, the subject matter of Example 136 can optionally include configured to calculate the compression filter based on the plurality of channel response estimates by calculating the compression filter based on the plurality of channel response estimates and the plurality of additional channel response estimates.

In Example 138, the subject matter of Example 136 can optionally include further configured to calculate a symbol detection filter based on the plurality of channel response estimates and the plurality of additional channel response estimates, and the apparatus is configured to perform symbol detection on the plurality of received data symbols using the compression filter to generate a plurality of detected data symbols by applying the symbol detection filter to the plurality of received data symbols to generate the plurality of detected data symbols.

In Example 139, the subject matter of Example 133 can optionally include further configured to calculate a symbol detection filter based on the compression filter and the plurality of additional reference symbols, and wherein the apparatus is configured to perform symbol detection of the plurality of received data symbols by applying the symbol detection filter to generate a plurality of detected data symbols.

In Example 140, the subject matter of Example 138 or 139 can optionally include wherein the apparatus is configured to perform symbol detection of the plurality of received data symbols by applying minimum mean squares estimation (MMSE) to the plurality of received data symbols using the symbol detection filter to generate the plurality of detected data symbols.

In Example 141, the subject matter of Example 131 can optionally include wherein the plurality of received data symbols contain a plurality of transmitted data symbols corresponding to the plurality of transmit terminals, and wherein the plurality of detected data symbols approximate the plurality of transmitted data symbols.

In Example 142, the subject matter of Example 131 can optionally include wherein the plurality of reference symbols include sounding reference symbols (SRS).

In Example 143, the subject matter of Example 131 can optionally include wherein the plurality of transmit terminals and the plurality of receive terminals are part of a multiple input multiple output (MIMO) scheme.

In Example 144, the subject matter of Example 131 can optionally include wherein the apparatus is further configured to calculate an updated compression filter, and transmit the updated compression filter to the radio processing apparatus.

In Example 145, the subject matter of Example 131 can optionally include configured to calculate a compression filter based on the plurality of channel response estimates by calculating an initial compression filter based on the plurality of channel response estimates, and compressing the initial compression filter to generate the compression filter.

In Example 146, the subject matter of Example 145 can optionally include configured to compress the initial compression filter to generate the compression filter by compressing the initial compression filter using a delta interpolation scheme or a linear interpolation scheme to generate the compression filter.

In Example 147, the subject matter of any one of Examples 131 to 146 can optionally include configured as a baseband unit (BBU).

In Example 148, the subject matter of Example 147 can optionally include wherein the radio processing unit is a remote radio unit (RRU).

In Example 149, the subject matter of any one of Examples 131 to 146 can optionally include wherein the plurality of transmit terminals are a plurality of user terminals and the plurality of receive terminals are a plurality of receive antennas.

In Example 150, the subject matter of any one of Examples 131 to 146 can optionally include wherein the plurality of detected data symbols approximate a plurality of transmitted data symbols each associated with a respective one of the plurality of transmit terminals.

In Example 151, the subject matter of Example 150 can optionally include wherein the plurality of transmitted data symbols correspond to a shared wireless resource as part of a multiple input multiple output (MIMO) scheme.

Example 152 is a method of processing signals in a baseband processing apparatus configured to be implemented in a base station, the method including calculating a plurality of channel response estimates based on a plurality of reference symbols associated with a plurality of transmit terminals, each of the plurality of channel response estimates approximating the wireless channel between a respective transmit terminal of the plurality of transmit terminals and a respective receive terminal of a plurality of receive terminals of the base station, calculating a compression filter based on the plurality of channel response estimates, transmitting the compression filter to a radio processing apparatus of the base station, receiving a plurality of received data symbols from the radio processing apparatus, and performing symbol detection on the plurality of received data symbols using the compression filter to generate a plurality of detected data symbols.

In Example 153, the subject matter of Example 152 can optionally include receiving the plurality of reference symbols from the radio processing apparatus.

In Example 154, the subject matter of Example 152 can optionally include receiving a plurality of additional reference symbols from the radio processing apparatus.

In Example 155, the subject matter of Example 154 can optionally include wherein the receiving the plurality of additional reference symbols from the radio processing apparatus includes receiving the plurality of additional reference symbols in a compressed form.

In Example 156, the subject matter of Example 154 can optionally include wherein the plurality of reference additional symbols include demodulation reference symbols (DMRS).

In Example 157, the subject matter of Example 154 can optionally include calculating a plurality of additional channel response estimates based on the plurality of additional reference symbols.

In Example 158, the subject matter of Example 157 can optionally include wherein the calculating a compression filter based on the plurality of channel response estimates includes calculating the compression filter based on the plurality of channel response estimates and the plurality of additional channel response estimates.

In Example 159, the subject matter of Example 157 can optionally include calculating a symbol detection filter based on the plurality of channel response estimates and the plurality of additional channel response estimates, and wherein the performing symbol detection on the plurality of received data symbols using the compression filter to generate a plurality of detected data symbols includes applying the symbol detection filter to the plurality of received data symbols to generate the plurality of detected data symbols.

In Example 160, the subject matter of Example 154 can optionally include calculating a symbol detection filter based on the plurality of channel response estimates and the plurality of additional reference symbols, and wherein the performing symbol detection on the plurality of received data symbols using the compression filter to generate a plurality of detected data symbols includes applying the symbol detection filter to the plurality of received data symbols to generate the plurality of detected data symbols.

In Example 161, the subject matter of Example 159 or 160 can optionally include wherein the applying the symbol detection filter to the plurality of received data symbols to generate the plurality of detected data symbols includes applying minimum mean squares estimation (MMSE) to the plurality of received data symbols using the symbol detection filter to generate the plurality of detected data symbols.

In Example 162, the subject matter of Example 152 can optionally include wherein the plurality of received data symbols contain a plurality of transmitted data symbols corresponding to the plurality of transmit terminals, and wherein the plurality of detected data symbols approximate the plurality of transmitted data symbols.

In Example 163, the subject matter of Example 152 can optionally include wherein the plurality of reference symbols include sounding reference symbols (SRS).

In Example 164, the subject matter of Example 152 can optionally include wherein the plurality of transmit terminals and the plurality of receive terminals are part of a multiple input multiple output (MIMO) scheme.

In Example 165, the subject matter of Example 152 can optionally include calculating an updated compression filter, and transmit the updated compression filter to the radio processing apparatus.

In Example 166, the subject matter of Example 152 can optionally include wherein the calculating a compression filter based on the plurality of channel response estimates includes calculating an initial compression filter based on the plurality of channel response estimates, and compressing the initial compression filter to generate the compression filter.

In Example 167, the subject matter of Example 166 can optionally include wherein the compressing the initial compression filter to generate the compression filter includes compressing the initial compression filter using a delta interpolation scheme or a linear interpolation scheme to generate the compression filter.

In Example 168, the subject matter of any one of Examples 152 to 167 can optionally include wherein the baseband processing apparatus is a baseband unit (BBU) and the radio processing apparatus is a remote radio unit (RRU).

In Example 169, the subject matter of any one of Examples 152 to 167 can optionally include wherein the plurality of transmit terminals are a plurality of user terminals and the plurality of receive terminals are a plurality of receive antennas.

In Example 170, the subject matter of any one of Examples 152 to 167 can optionally include wherein the plurality of detected data symbols approximate a plurality of transmitted data symbols each associated with a respective one of the plurality of transmit terminals.

In Example 171, the subject matter of Example 170 can optionally include wherein the plurality of transmitted data symbols correspond to a shared wireless resource as part of a multiple input multiple output (MIMO) scheme.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus for processing radio frequency signals in a base station, the apparatus comprising:
    a pre-processing circuit configured to obtain a plurality of aggregated data symbols, wherein each of the plurality of aggregated data symbols corresponds to a receive terminal of a plurality of receive terminals of the base station and is composed of transmitted data symbols from a plurality of transmit terminals; and
    a compression processing circuit configured to:
        apply a compression filter, received from a baseband processing apparatus in communication with the compression processing circuit, to the plurality of aggregated data symbols to reduce the plurality of aggregated data symbols into a plurality of isolated data symbols, the compression filter being based on channel estimates between the plurality of receive terminals and the plurality of transmit terminals; and
        transmit the plurality of isolated data symbols to a baseband processing apparatus of the base station.

2. The apparatus of claim 1, wherein the compression processing circuit is further configured to receive the compression filter from the baseband processing apparatus in a compressed form.

3. The apparatus of claim 1, wherein the compression processing circuit is configured to calculate the compression filter by:
    calculating a plurality of channel response estimates based on a plurality of reference symbols corresponding to the plurality of transmit terminals, each of the plurality of channel response estimates approximating the wireless channel between a respective transmit terminal of the plurality of transmit terminals and a respective receive terminal of the plurality of receive terminals; and
    calculating the compression filter based on the plurality of channel response estimates.

4. The apparatus of claim 3, wherein the plurality of reference symbols comprise demodulation reference symbols (DMRS).

5. The apparatus of claim 1, wherein the compression processing circuit is configured to calculate the compression filter.

6. The apparatus of claim 1, wherein the number of aggregated data symbols of the plurality of data symbols is greater than the number of isolated data symbols of the plurality of isolated data symbols.

7. The apparatus of claim 6, wherein the number of aggregated data symbols of the plurality of data symbols is correlated with the number of receive terminals of the plurality of receive terminals, and wherein the number of isolated data symbols of the plurality of isolated data symbols is correlated with the number of transmit terminals of the plurality of transmit terminals.

8. The apparatus of claim 1, wherein the plurality of transmit terminals and the plurality of receive terminals are part of a multiple input multiple output (MIMO) scheme.

9. The apparatus of claim 1, wherein the apparatus is a remote radio unit (RRU) and the baseband processing apparatus is a baseband unit (BBU).

10. The apparatus of claim 1, wherein the apparatus and the baseband processing apparatus are connected by an interconnection data link, and wherein the transmitting the plurality of isolated data symbols to the baseband processing apparatus comprises transmitting the plurality of isolated data symbols over the interconnection data link.

11. A base station comprising:
a plurality of receive antennas;
baseband processing circuitry, configured to calculate a compression filter;
radio processing circuitry; and
a data link between the radio processing circuitry and the baseband processing circuitry,
wherein the radio processing circuitry is configured to:
receive a plurality of aggregated data symbols from the plurality of receive antennas, wherein each of the plurality of aggregated data symbols is composed of transmitted data symbols from a plurality of transmit terminals and corresponds to an antenna of the plurality of antennas;
apply the compression filter, received from the baseband processing circuitry over the data link, to the plurality of aggregated data symbols to reduce the plurality of aggregated data symbols into a plurality of isolated data symbols, the compression filter being based on channel estimates between the plurality of receive antennas and the plurality of transmit terminals; and
transmit the plurality of isolated data symbols to the baseband processing circuitry over the data link.

12. The base station of claim 11, wherein the baseband processing circuitry is configured to perform symbol detection on the plurality of isolated data symbols to generate plurality of detected data symbols.

13. The base station of claim 11, wherein the radio processing circuitry is configured to calculate the compression filter by:
calculating a plurality of channel response estimates based on a plurality of reference symbols corresponding to the plurality of transmit terminals, each of the plurality of channel response estimates approximating the wireless channel between a respective transmit terminal of the plurality of transmit terminals and a respective receive terminal of the plurality of receive terminals; and
calculating the compression filter based on the plurality of channel response estimates.

14. The base station of claim 13, wherein the plurality of transmit terminals and the plurality of receive terminals are part of a multiple input multiple output (MIMO) scheme.

15. The base station of claim 11, wherein the baseband processing circuitry is configured to calculate the compression filter by calculating a plurality of channel response estimates based on the plurality of reference symbols, each of the plurality of channel response estimates approximating the wireless channel between a respective transmit terminal of the plurality of transmit terminals and a respective receive terminal of the plurality of receive terminals.

16. The base station of claim 11, wherein the data link comprises an interconnection data link.

17. The base station of claim 11, wherein the number of aggregated data symbols of the plurality of data symbols is greater than the number of isolated data symbols of the plurality of isolated data symbols.

18. An apparatus for processing baseband frequency signals in a base station, the apparatus having one or more digital processing circuits, wherein the apparatus is configured to:
calculate a plurality of channel response estimates based on a plurality of reference symbols associated with a plurality of transmit terminals, each of the plurality of channel response estimates approximating a wireless channel between a respective transmit terminal of the plurality of transmit terminals and a respective receive terminal of a plurality of receive terminals of the base station;
calculate a compression filter based on the plurality of channel response estimates;
transmit the compression filter to a radio processing apparatus of the base station;
receive a plurality of received data symbols from the radio processing apparatus; and
perform symbol detection of the plurality of received data symbols using the compression filter to generate a plurality of detected data symbols.

19. The apparatus of claim 18, configured to calculate the compression filter based on the plurality of channel response estimates by:
calculating the compression filter based on the plurality of channel response estimates and a plurality of additional channel response estimates.

20. The apparatus of claim 18, wherein the plurality of transmit terminals and the plurality of receive terminals are part of a multiple input multiple output (MIMO) scheme.

* * * * *